(12) United States Patent
Sherman

(10) Patent No.: US 11,829,421 B2
(45) Date of Patent: Nov. 28, 2023

(54) DYNAMIC GRAPH GENERATION FOR INTERACTIVE DATA ANALYSIS

(71) Applicant: Tableau Software, LLC, Seattle, WA (US)

(72) Inventor: Scott Sherman, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/091,536

(22) Filed: Nov. 6, 2020

(65) Prior Publication Data

US 2021/0141831 A1 May 13, 2021

Related U.S. Application Data

(60) Provisional application No. 62/933,305, filed on Nov. 8, 2019.

(51) Int. Cl.
*G06F 15/16* (2006.01)
*G06F 16/904* (2019.01)
(Continued)

(52) U.S. Cl.
CPC .......... *G06F 16/904* (2019.01); *C12C 11/003* (2013.01); *C12C 11/06* (2013.01);
(Continued)

(58) Field of Classification Search
None
See application file for complete search history.

(56) References Cited

U.S. PATENT DOCUMENTS 5,550,971 A * 8/1996 Brunner ............ G06F 16/24552
5,689,711 A * 11/1997 Bardasz .................... G06F 8/34
717/105

(Continued)

FOREIGN PATENT DOCUMENTS

WO 2006060773 A2 6/2006

OTHER PUBLICATIONS

Gillis, Alexander S.; and Silverthorne, Valerie. "What is integrated development environment (IDE)?—Definition from WhatIs.com." Published Sep. 2018 by TechTarget. Accessed Aug. 11, 2022 from https://www.techtarget.com/searchsoftwarequality/definition/integrated-development-environment (Year: 2018).*

(Continued)

*Primary Examiner* — Alex Gofman
(74) *Attorney, Agent, or Firm* — Morgan, Lewis & Bockius LLP

(57) ABSTRACT

Embodiments are directed to visualizing data using a graphical user interface (GUI) that may include a graph panel and a visualization panel arranged to receive inputs or interactions. A data model may be provided and displayed in the visualization panel. Input information that specifies portions of the data model may be provided to the visualization panel. Transform models may be determined based on the specified portions of the data model such that the determined transform models include a model interface that accepts the input information. The transform models may be employed to generate graph objects based on the data model, the input information such that the graph objects may be included in a graph model. Queries based on the graph model may be executed to provide results from the data model such that the results may be displayed in a visualization.

24 Claims, 15 Drawing Sheets

(51) Int. Cl.
*G06F 16/903* (2019.01)
*G06F 16/901* (2019.01)
*C12C 11/00* (2006.01)
*C12C 11/06* (2006.01)
*C12C 12/04* (2006.01)

(52) U.S. Cl.
CPC .......... *C12C 12/04* (2013.01); *G06F 16/9024* (2019.01); *G06F 16/90335* (2019.01)

(56) References Cited

U.S. PATENT DOCUMENTS

| | | | |
|---|---|---|---|
| 8,286,087 | B1 | 10/2012 | Xian et al. |
| 9,383,913 | B2 | 7/2016 | Hoyer et al. |
| 9,489,119 | B1 | 11/2016 | Smith, Jr. |
| 9,760,240 | B2 | 9/2017 | Maheshwari et al. |
| 9,881,066 | B1 | 1/2018 | Yousaf et al. |
| 10,275,265 | B1 | 4/2019 | Gould et al. |
| 10,445,170 | B1 | 10/2019 | Subramanian et al. |
| 10,698,955 | B1 | 6/2020 | Broecheler |
| 10,705,695 | B1 | 7/2020 | Porath et al. |
| 10,783,162 | B1 | 9/2020 | Montague et al. |
| 2004/0205562 | A1 | 10/2004 | Rozek et al. |
| 2006/0064674 | A1 | 3/2006 | Olson, Jr. et al. |
| 2008/0126987 | A1 | 5/2008 | Meschian et al. |
| 2009/0006939 | A1 | 1/2009 | DeSpain et al. |
| 2009/0007122 | A1 | 1/2009 | Peyton et al. |
| 2009/0012983 | A1 | 1/2009 | Senneville et al. |
| 2010/0114629 | A1* | 5/2010 | Adler .................... G06Q 10/00 705/7.36 |
| 2010/0138420 | A1 | 6/2010 | Bator et al. |
| 2010/0235771 | A1 | 9/2010 | Gregg, III |
| 2010/0313157 | A1 | 12/2010 | Carlsson et al. |
| 2010/0318583 | A1 | 12/2010 | Cohen |
| 2011/0219321 | A1 | 9/2011 | Gonzalez Veron et al. |
| 2012/0311497 | A1 | 12/2012 | Bear et al. |
| 2014/0026084 | A1 | 1/2014 | Gilboa |
| 2014/0058789 | A1 | 2/2014 | Doehring et al. |
| 2014/0074888 | A1 | 3/2014 | Potter et al. |
| 2014/0114907 | A1 | 4/2014 | Kozina et al. |
| 2014/0215405 | A1 | 7/2014 | Breedvelt-Schouten |
| 2014/0267287 | A1 | 9/2014 | Dodgen et al. |
| 2014/0330821 | A1 | 11/2014 | Tullis et al. |
| 2014/0372956 | A1* | 12/2014 | Bisca .................... G06F 16/93 715/848 |
| 2015/0112998 | A1 | 4/2015 | Shankar et al. |
| 2015/0339263 | A1* | 11/2015 | Abu El Ata ....... G06Q 10/0635 703/2 |
| 2015/0347091 | A1 | 12/2015 | Ferko et al. |
| 2016/0078361 | A1* | 3/2016 | Brueckner ............. H04L 67/10 706/12 |
| 2016/0103908 | A1 | 4/2016 | Fletcher et al. |
| 2016/0224532 | A1 | 8/2016 | Miller et al. |
| 2016/0224616 | A1 | 8/2016 | Beacom et al. |
| 2016/0232207 | A1 | 8/2016 | Brunel et al. |
| 2016/0314605 | A1 | 10/2016 | Filippi et al. |
| 2017/0010787 | A1 | 1/2017 | Ranganathan et al. |
| 2017/0075557 | A1 | 3/2017 | Noble et al. |
| 2017/0091317 | A1 | 3/2017 | Cummings et al. |
| 2017/0102694 | A1 | 4/2017 | Enver et al. |
| 2017/0103103 | A1 | 4/2017 | Nixon et al. |
| 2017/0140068 | A1 | 5/2017 | Oh et al. |
| 2017/0154088 | A1 | 6/2017 | Sherman |
| 2017/0161188 | A1 | 6/2017 | Isoi |
| 2017/0177681 | A1 | 6/2017 | Potiagalov et al. |
| 2017/0177744 | A1* | 6/2017 | Potiagalov .......... G06F 16/9024 |
| 2017/0178368 | A1 | 6/2017 | Noon et al. |
| 2017/0193049 | A1* | 7/2017 | Grehant ................. G06F 16/22 |
| 2017/0213131 | A1 | 7/2017 | Hammond et al. |
| 2017/0220633 | A1 | 8/2017 | Porath et al. |
| 2017/0286526 | A1 | 10/2017 | Bar-Or et al. |
| 2017/0293666 | A1* | 10/2017 | Ragavan ................. G06N 5/02 |
| 2017/0316355 | A1 | 11/2017 | Shrestha et al. |
| 2018/0024731 | A1 | 1/2018 | Sanches et al. |
| 2018/0067998 | A1 | 3/2018 | Sherman et al. |
| 2018/0129369 | A1 | 5/2018 | Kim et al. |
| 2018/0157702 | A1 | 6/2018 | Clemens et al. |
| 2018/0218050 | A1 | 8/2018 | Porath et al. |
| 2018/0260106 | A1 | 9/2018 | Leonard et al. |
| 2018/0260903 | A1* | 9/2018 | Callery .................. G06N 20/00 |
| 2019/0034489 | A1 | 1/2019 | Ziegler |
| 2019/0095395 | A1 | 3/2019 | Plecko |
| 2019/0188308 | A1 | 6/2019 | Simon et al. |
| 2019/0286668 | A1 | 9/2019 | Puzicha et al. |
| 2019/0294720 | A1 | 9/2019 | Beringer et al. |
| 2019/0325292 | A1 | 10/2019 | Remis et al. |
| 2019/0332599 | A1 | 10/2019 | Woo |
| 2019/0384836 | A1* | 12/2019 | Roth .................... G06F 16/9024 |
| 2020/0104401 | A1* | 4/2020 | Burnett ............... G06F 16/2477 |
| 2020/0104402 | A1 | 4/2020 | Burnett et al. |
| 2020/0175006 | A1* | 6/2020 | Hughes ................... G06N 3/02 |
| 2020/0285803 | A1* | 9/2020 | Edge ....................... G06F 16/93 |
| 2020/0334277 | A1 | 10/2020 | Doyle et al. |
| 2020/0372057 | A1 | 11/2020 | Tonkin et al. |
| 2020/0401623 | A1* | 12/2020 | Dilts ..................... G06F 16/904 |
| 2021/0263900 | A1 | 8/2021 | Joyce et al. |
| 2021/0390420 | A1 | 12/2021 | Barnett |
| 2022/0113150 | A1 | 4/2022 | Hidayat et al. |

OTHER PUBLICATIONS

Office Communication for U.S. Appl. No. 16/984,014 dated Aug. 10, 2021, pp. 1-32.

Furmanova, Katarina et al., "Taggle: Scalable Visualization of Tabular Data through Aggregation," IEEE Transactions on Visualization and Computer Graphics, 2017, pp. 1-14.

Pienta, Robert et al., "VISAGE: Interactive Visual Graph Querying," AVI '16, Jun. 7-10, 2016, Bari Italy, pp. 272-279.

Von Landesberger, Tatiana et al., "A System for Interactive Visual Analysis of Large Graphs Using Motifs in Graph Editing and Aggregation," VMV 2009, pp. 1-9.

Office Communication for U.S. Appl. No. 16/586,554 dated Jul. 24, 2020, pp. 1-27.

Office Communication for U.S. Appl. No. 16/586,554 dated Nov. 24, 2020, pp. 1-28.

Office Communication for U.S. Appl. No. 16/586,554 dated Feb. 16, 2021, pp. 1-7.

Office Communication for U.S. Appl. No. 16/586,554 dated Apr. 2, 2021, pp. 1-37.

Office Communication for U.S. Appl. No. 16/725,986 dated Apr. 2, 2021, pp. 1-23.

Papenbrock, Thorsten et al., "Data-driven Schema Normalization," in Proceedings of the 20th International Conference on Extending Database Technology, 2017, pp. 342-353.

Brunel, Robert et al., "Supporting Hierarchical Data in SAP HANA," 2015 IEEE 31st International Conference on Data Engineering (ICDE), 2015, pp. 1-12.

Office Communication for U.S. Appl. No. 16/944,043 dated Nov. 26, 2021, pp. 1-49.

Office Communication for U.S. Appl. No. 16/586,554 dated Dec. 15, 2021, pp. 1-7.

Office Communication for U.S. Appl. No. 16/984,014 dated Jan. 3, 2022, pp. 1-31.

Office Communication for U.S. Appl. No. 16/586,554 dated Feb. 24, 2022, pp. 1-47.

Office Communication for U.S. Appl. No. 16/984,014 dated Mar. 18, 2022, pp. 1-5.

Office Communication for U.S. Appl. No. 16/586,554 dated Sep. 27, 2021, pp. 1-45.

Office Communication for U.S. Appl. No. 16/725,986 dated Sep. 30, 2021, pp. 1-10.

Office Communication for U.S. Appl. No. 16/944,043 dated Apr. 19, 2022, pp. 1-10.

Office Communication for U.S. Appl. No. 16/984,014 dated Apr. 20, 2022, pp. 1-33.

Office Communication for U.S. Appl. No. 16/586,554 dated Jan. 5, 2023, pp. 1-24.

Office Communication for U.S. Appl. No. 17/370,367 dated Jan. 27, 2023, pp. 1-14.

(56) References Cited

OTHER PUBLICATIONS

International Search Report and Written Opinion for International Patent Application No. PCT/US2020/028163 dated Jul. 21, 2020, pp. 1-7.
Office Communication for U.S. Appl. No. 16/389,389 dated May 13, 2021, pp. 1-16.
Office Communication for U.S. Appl. No. 16/389,389 dated Aug. 18, 2021, pp. 1-9.
International Search Report and Written Opinion for International Patent Application No. PCT/US2022/031195 dated Aug. 31, 2022, pp. 1-12.
Office Communication for U.S. Appl. No. 17/542,148 dated Oct. 27, 2022, pp. 1-14.
International Search Report and Written Opinion for International Patent Application No. PCT/US2022/038328 dated Nov. 30, 2022, pp. 1-12.
Office Communication for U.S. Appl. No. 17/409,299 dated Feb. 14, 2023, pp. 1-28.
Bauer, Reinhard et al., "The Shortcut Problem—Complexity and Algorithms," Journal of Graph Algorithms and Applications, Aug. 2012, vol. 16, No. 2, pp. 447-481.
Hesse, William, "Directed Graphs Requiring Large Numbers of Shortcuts," in Proceedings of the Fourteenth Annual ACM-SIAM Symposium on Discrete Algorithms, Jan. 2003, pp. 665-669.
Office Communication for U.S. Appl. No. 16/586,554 dated Aug. 17, 2022, pp. 1-56.
Office Communication for U.S. Appl. No. 17/370,367 dated Sep. 1, 2022, pp. 1-13.
International Search Report and Written Opinion for International Patent Application No. PCT/US2022/034283 dated Oct. 27, 2022, pp. 1-12.
Office Communication for U.S. Appl. No. 16/586,554 dated Nov. 21, 2022, pp. 1-6.
Office Communication for U.S. Appl. No. 17/542,148 dated Feb. 17, 2023, pp. 1-8.
Office Communication for U.S. Appl. No. 17/542,148 dated Feb. 28, 2023, pp. 1-2.
Office Communication for U.S. Appl. No. 17/370,367 dated Apr. 6, 2023, pp. 1-4.
Office Communication for U.S. Appl. No. 17/370,367 dated May 24, 2023, pp. 1-18.
Office Communication for U.S. Appl. No. 17/535,465 dated Jun. 8, 2023, pp. 1-7.
Office Communication for U.S. Appl. No. 17/409,299 dated Jun. 28, 2023, pp. 1-36.

* cited by examiner

| Dept Manager | Executive | Emp | Manager | Title | Location |
|---|---|---|---|---|---|
| B Wills | A Anery | A Bonce | F Drude | Sales Assoc | Kirkland |
| S Grand | G Rudd | C Drigg | E Funge | Developer | Seattle |
| R Roman | A Anery | R Kimint | N Nonce | Sales Assoc | Kirkland |
| F Smith | A Anery | W Errit | T Wedge | Sales Assoc | Kirkland |
| W Devin | G Rudd | J Westie | M Mince | Developer | Seattle |
| ... | | | | ... | |
| S Grand | G Rudd | P Lille | E Funge | Developer | Seattle |
| B Wills | A Anery | M Kover | F Fire | Sales Assoc | Kirkland |

*Fig. 5*

DYNAMIC GRAPH GENERATION FOR INTERACTIVE DATA ANALYSIS

CROSS-REFERENCE TO RELATED APPLICATIONS

This application is a Utility Patent application based on previously filed U.S. Provisional Patent Application Ser. No. 62/933,305, filed on Nov. 8, 2019, the benefit of the filing date of which is hereby claimed under 35 U.S.C. § 119(e) and which is further incorporated in entirety by reference.

TECHNICAL FIELD

The present invention relates generally to data visualization, and more particularly, but not exclusively to, interactive data analysis.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases, the quantity of data may make it difficult to effectively utilize the collected data to improve business practices. In some cases, organizations may generate visualizations of the some or all of their data. Employing visualizations to represent this data may enable organizations to improve their understanding of critical business operations and help them monitor key performance indicators. However, in some cases, various factors may work against enabling organizations to generate effective visualizations. For example, in some cases, the data might not be in a form or shape that is conducive to the types of analysis that are of interest to the organization. Also, for example, even if the data is provided in a form or shape that may be useful for one type of analysis, that form or shape may be disadvantageous for other types of analysis that may be of interest to the organization. Thus, is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 5 illustrates a logical representation of a portion of a data model for dynamic graph generation for interactive data analysis in accordance with one or more of the various embodiments;

DETAILED DESCRIPTION OF VARIOUS EMBODIMENTS

Figure 1:
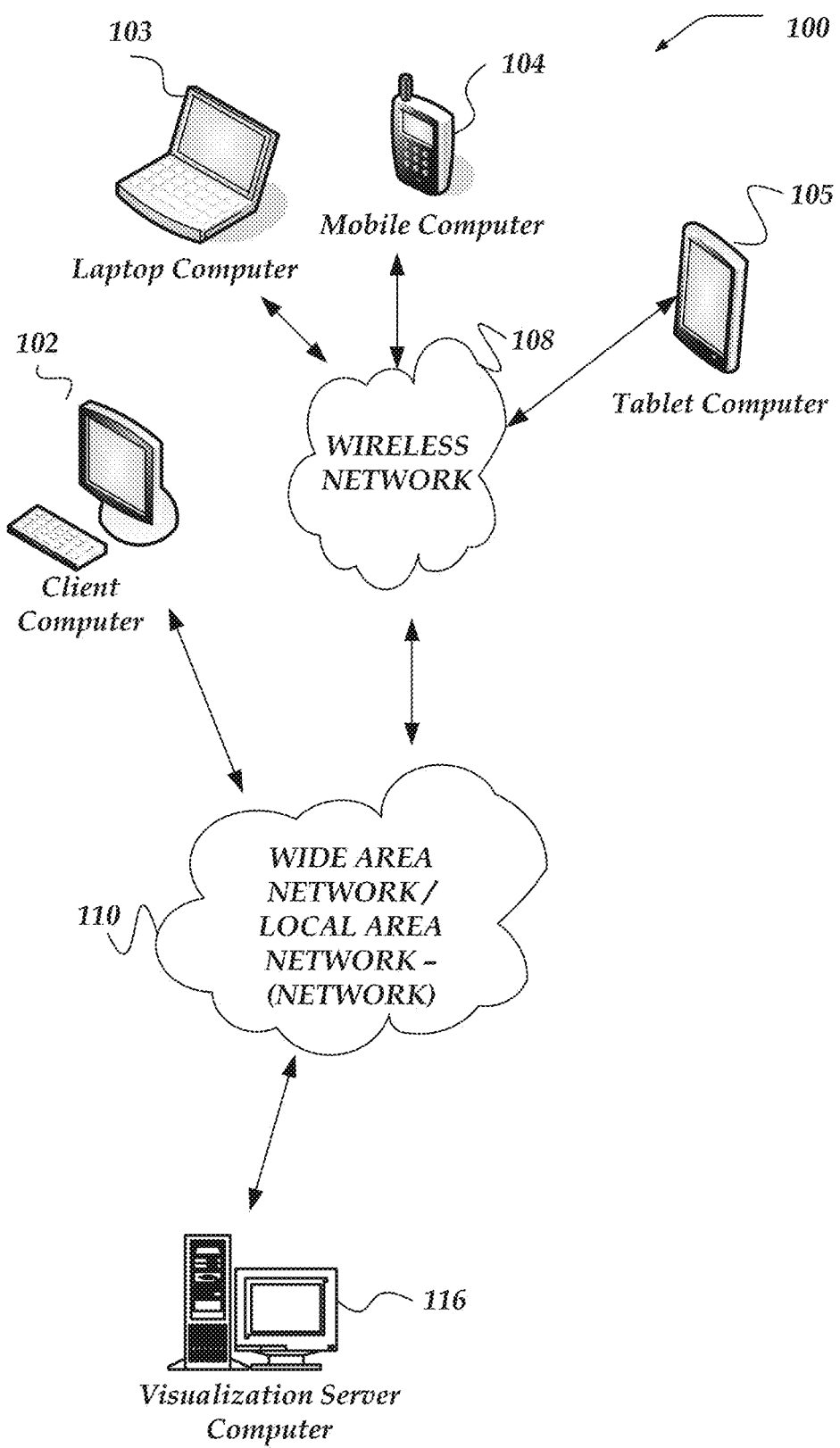
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein the term "data object" refers to one or more entities or data structures that comprise data models. In some cases, data objects may be considered portions of the data model. Data objects may represent individual instances of items or classes or kinds of items.

As used herein the term "graph model" refers to one or more data structures that may be comprised of one or more nodes and one or more edges to represent data objects and relationships between or among them. Nodes may be associated with one or more graph objects and edges may be associated with one or more relationships between the graph objects.

As used herein the term "graph object" refers to one or more entities or data structures that comprise graph models. In some cases, graph objects may be considered portions of a graph model. In some case, graph objects may represent individual instances of items or classes or kinds of items. In some graph models, the graph objects may be associated with data objects in a data model.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As user herein the "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to visualizing data using one or more processors that execute one or more instructions to perform as described herein. In one or more of the various embodiments, a graphical user interface (GUI) that may include a graph panel and a visualization panel may be generated such that the graph panel and the visualization panel are arranged to receive one or more inputs or interactions.

In one or more of the various embodiments, a data model that includes a plurality of records may be provided such that one or more portions of the data model may be displayed in the visualization panel. In one or more of the various embodiments, providing the data model may include, providing one or more data sources based on one or more of a database, a columnar data store, or structured text files.

In one or more of the various embodiments, input information may be provided based on one or more inputs to the visualization panel such that the input information specifies one or more portions of the data model.

In one or more of the various embodiments, one or more transform models may be determined based on the one or more specified portions of the data model such that the determined one or more transform models include a model interface that accepts the input information.

In one or more of the various embodiments, the one or more transform models may be employed to generate one or more graph objects based on the data model, the input information, or the like, such that the one or more graph objects may be included in a graph model that may be comprised of nodes that represent the one or more graph objects and one or more edges that represent one or more relationships between two or more graph objects, and such that at least one of the one or more relationships may be unrepresented in the data model. In one or more of the various embodiments, generating the one or more graph objects, may include: determining one or more operations that may be specified by the one or more transform models; and executing the one or more operations on the data model to generate the one or more graph objects.

In one or more of the various embodiments, a query based on the graph model may be executed to provide one or more results from the data model such that the one or more results may be displayed in a visualization to one or more users. In one or more of the various embodiments, executing the query based on the graph model, may include: determining one or more graph objects that correspond to the query; determining one or more records from the data model based on the one or more graph objects that correspond to the query; and generating the one or more results to the query based on the one or more records.

In one or more of the various embodiments, the one or more transform models may be employed to evaluate one or more attributes of a first portion of the one or more graph objects with one or more other attributes of a second portion of the one or more graph objects. And, in some embodiments, one or more relationships may be determined based on the evaluation satisfying one or more conditions specified in the one or more transform models.

In one or more of the various embodiments, other input information may be provided based on one or more inputs to the graph panel such that the other input information specifies one or more of the one or more nodes or the one or more edges of the graph model. In one or more of the various embodiments, one or more graph transform models may be determined based on the other input information. And, in some embodiments, the graph model may be modified based on the one or more graph transform models.

In one or more of the various embodiments, two or more eligible transform models may be determined based on the input information. In some embodiments, the two or more eligible transform models may be rank ordered based on a weight score. And, in some embodiments, one or more transform models may be employed to generate the one or more graph objects based on the ranked ordering.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 or the like, as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
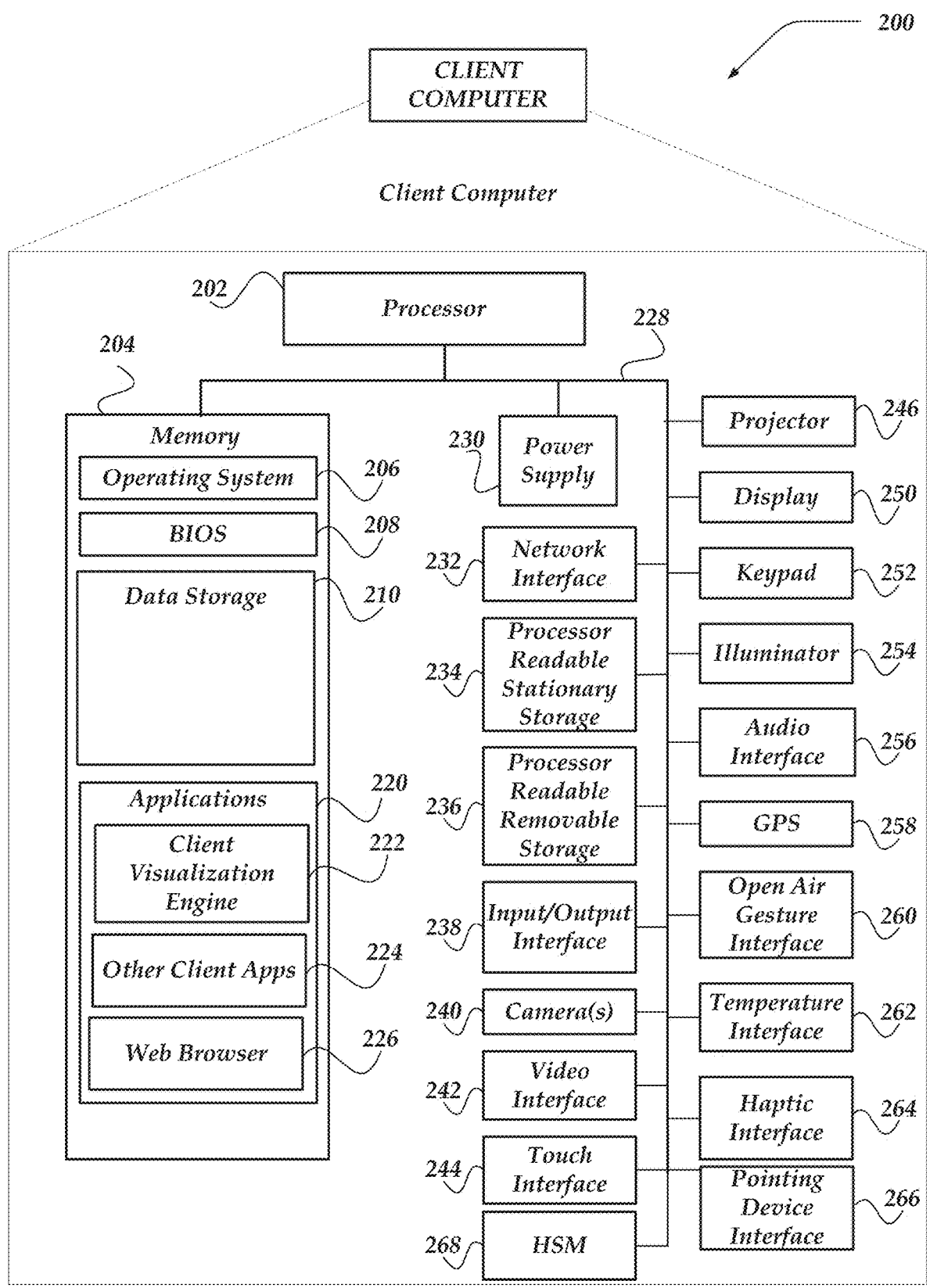
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
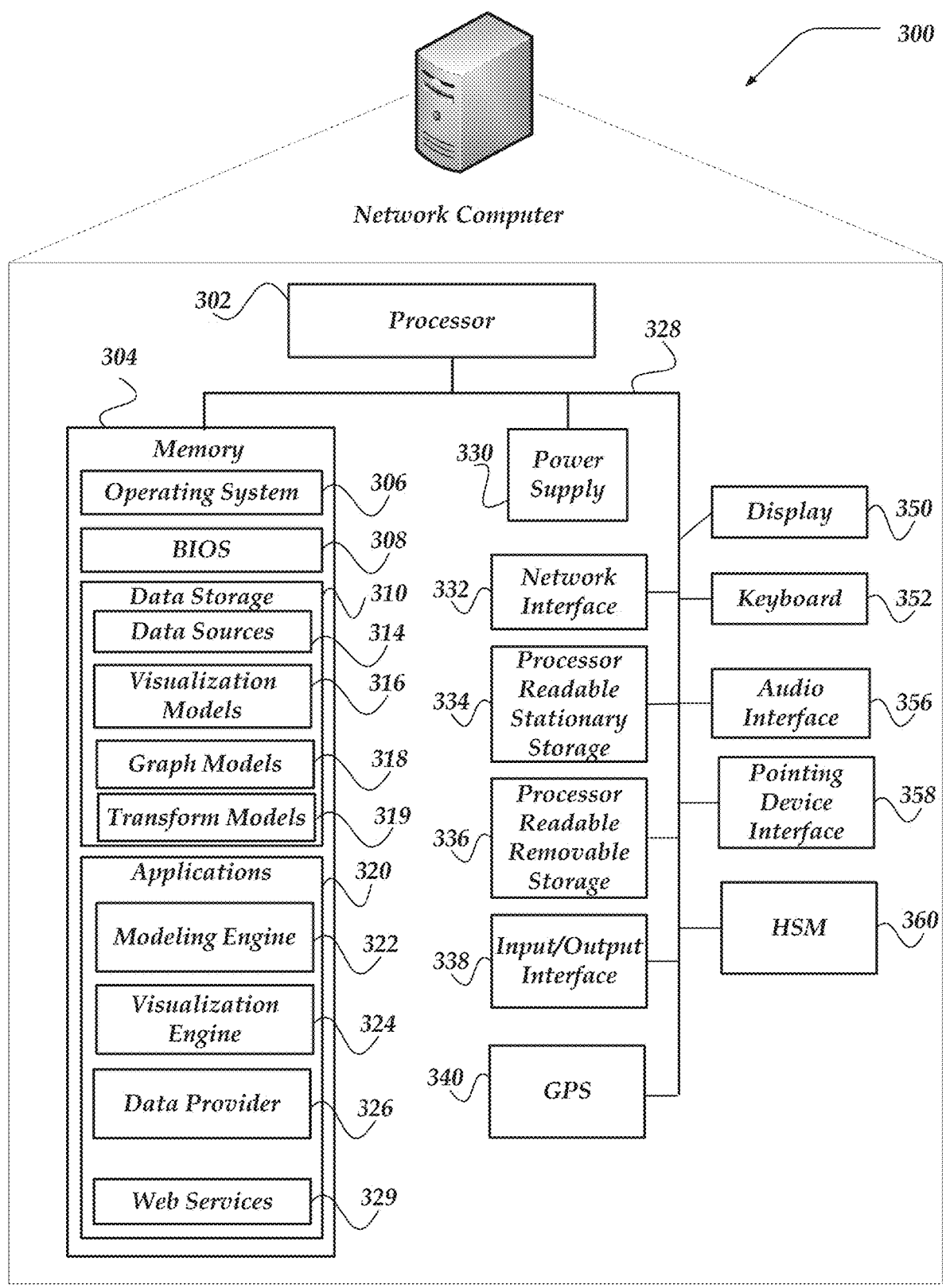
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, visualization engine 324, data provider 326, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data sources 314, visualization models 316, graph models 318, transform models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, visualization engine 324, data provider 326, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, visualization engine 324, data provider 326, other applications 329, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, visualization engine 324, data provider 326, other applications 329, or the like, may be provisioned and de-commissioned automatically.

Also, in one or more of the various embodiments, modeling engine 322, visualization engine 324, data provider 326, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
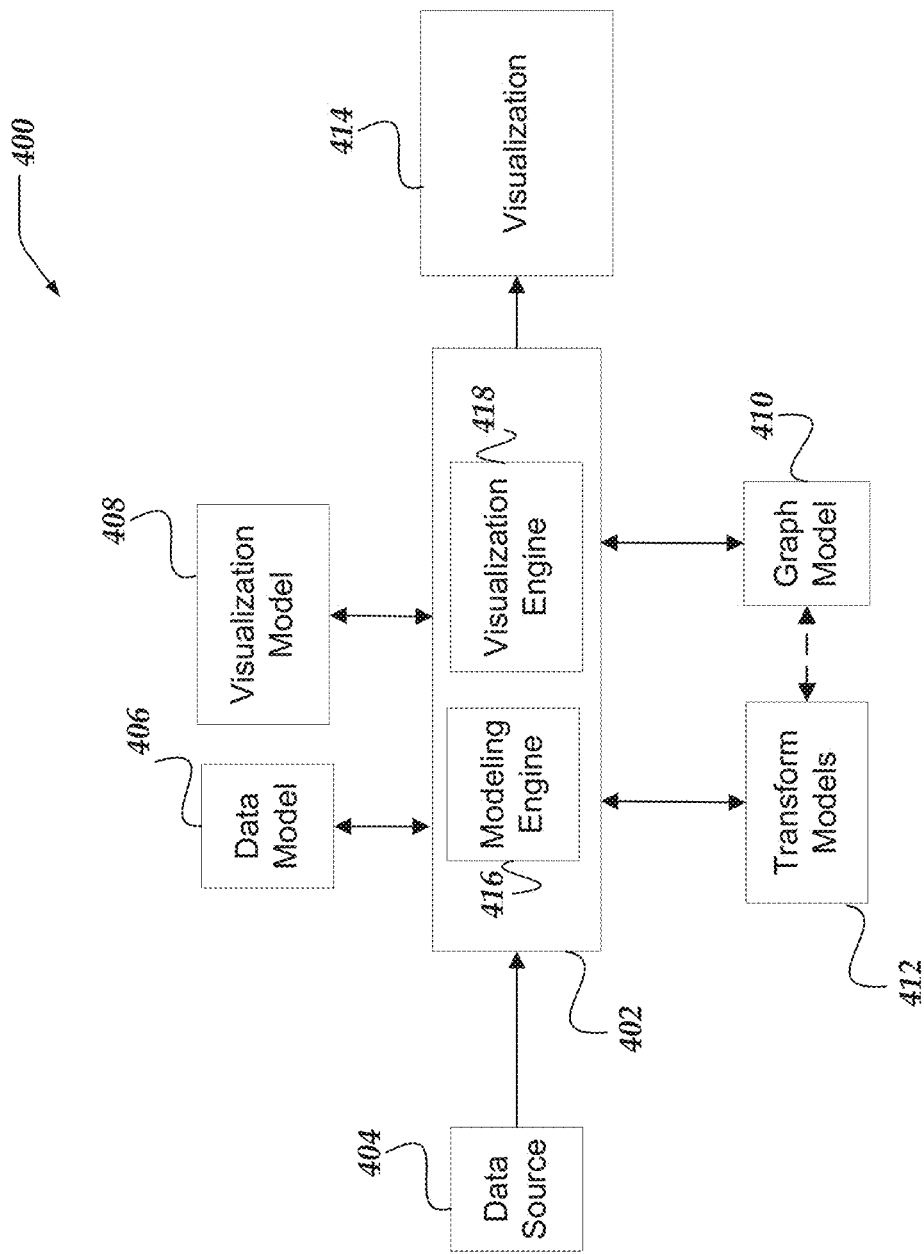
FIG. 4 illustrates a logical architecture of a system for dynamic graph generation for interactive data analysis in accordance with one or more of the various embodiments.

FIG. 4 illustrates a logical architecture of system 400 for dynamic graph generation for interactive data analysis in accordance with one or more of the various embodiments. In one or more of the various embodiments, system 400 may be a visualization platform arranged to include various components including: visualization server 402; one or more data sources, such as, data source 404; one or more data models, such as, as data model 406, one or more visualization models, such as, visualization model 408; one or more graph models, such as, graph model 410; one or more transform models, such as, transform models 412; one or more visualizations, such as, visualization 414; one or more modeling engines, such as, modeling engine 416; one or more visualization engines, such as, visualization engine 418; or the like.

In one or more of the various embodiments, visualization servers, such as, visualization server 402 may be arranged to generate one or more visualizations, such as, visualization 414. In some embodiments, visualization server 402 may be arranged to obtain information from data sources, such as, data source 404. Accordingly, in some embodiments, some or all of the information provided by data source 404 may be mapped to or otherwise extracted and transformed into one or more of one or more data models or visualization models. Thus, in some embodiments, visualization servers may be arranged to generate one or more visualizations, such as, visualization 414 based the data models or visualization models.

In some embodiments, a modeling engine, such as, modeling engine 416 may be employed to transform some or all of information provided by data source 404 into one or more data models, such as, data model 406. In some embodiments, the modeling engine may be arranged to employ or execute computer readable instructions provided by configuration information to determine some or all of the steps for transforming information provided by data sources into data models.

In one or more of the various embodiments, configuration information, including user input, may be employed to select one or more portions of the information provided by data sources to transform into a data model.

In one or more of the various embodiments, visualization models may be comprised of one or more display objects. In some embodiments, display objects may represent a visualization or partial visualization of the data associated with one or more data objects. The particular visualization expressed by a display object may be selected based the composition (e.g., data type, properties, number of items, semantic meaning, or the like) of a given data object. In some embodiments, a data object may be associated with more than one display object, each representing a different visualization of the given data object. Accordingly, display objects may be arranged to represent different common, uncommon, or custom, visualization elements, such as, line plots, surface plots, bar charts, pie charts, tables, text fields, text areas, or the like, that may be included in visualizations to provide improved understanding of data. In some embodiments, visualizations may be targeted for different audiences, such as, customers, stakeholders, internal teams, business intelligence teams, or the like. Accordingly, more than one display model may be generated or associated with the same data model.

Further, in one or more of the various embodiments, modeling engines, such as, modeling engine 416 may be arranged to enable dynamic graph generation for interactive data analysis based on selectively transforming information in a data model to provide one or more graph models.

Accordingly, in one or more of the various embodiments, modeling engines may be arranged to employ one or more transform models, such as, transform models 412 to transform one or more portions of a data model, such as, data model 406 into portions of a graph model, such as, graph model 410. Likewise, in some embodiments, other transform models may be arranged to support modifying existing graph models. In one or more of the various embodiments, transform models designed for transforming information from a data model to a graph model may be referred to as data transform models. Likewise, in some embodiments, transform models designed for modifying graph models may be referred to as graph transform models. Herein, descriptions that refer to transform models absent further qualification may be considered to refer to features or characteristics that may be common to both data transform models or graph transform models.

In some embodiments, modeling engines may be arranged to employ one or more data transform models to determine transformation operations for one or more provided portions of a data model. In some embodiments, one or more of the transformations may include generating or modifying one or more portions of a graph model based on the provided data model portions. Also, in some embodiments, one or more of the transformations may include performing operations that modify, augment, or annotate, the data model. Further, in some embodiments, transformations or operations associated with one or more of the data transform models may be directed to both a data model and a graph model.

Accordingly, in one or more of the various embodiments, modeling engines may be arranged to employ one or more data transform models to process or evaluate one more data objects from a data model to generate one or more graph objects and graph relationships. In some embodiments, graph objects may be represented as nodes in a graph and relationships between graph objects may be represented as edges in the graph.

In some embodiments, modeling engines may be arranged to employ one or more graph transform models to determine transformation operations for one or more provided portions of a graph model. In some embodiments, one or more of the transformations may include generating or modifying one or more portions of the graph model based on one or more of the provided graph model portions, the associated data model, or the like. Also, in some embodiments, one or more of the transformations may include performing operations that modify, augment, or annotate, the data model. Further, in some embodiments, transformations or operations associated with one or more graph transform models may be, in some cases, directed to both a data model and a graph model.

In one or more of the various embodiments, visualization engines may employ one or more visualization models to generate one or more visualizations, such as, visualization 414 based on one or more of the graph model, the data model, or combination thereof. For example, in some embodiments, a visualization platform, such as, system 400, may be arranged to include one or more default visualization models that may be employed to generate visualizations based on a graph model. Accordingly, in one or more of the various embodiments, visualizations may be updated in real-time as transform models are employed to modify the graph models. Also, in one or more of the various embodiments, one or more custom or user-authored visualization models may be associated with a graph model such that changes made to graph model may be automatically incorporated into visualizations based on the one or more custom or user-authored visualization models as modifications to a graph model occur.

FIG. 5 illustrates a logical representation of a portion of data model 500 for dynamic graph generation for interactive data analysis in accordance with one or more of the various embodiments. As described above, one or more data models based on information provided by one or more data sources may be represented using data models, such as, data model 500. In this example, data model 500 is shown as in a tabular format. Accordingly, for this example, the shape or format of the information provided by the data sources may have been tabular. Or, in some cases, one or more ingestion actions (e.g., ETL processes) may have been executed on the information provided by the data sources. Similarly, in one or more of the various embodiments, other information provided by one or more data sources may have a native shape or format that results in non-tabular data model, such as, tree-based models, columnar-based models, structured documents, or the like.

In one or more of the various embodiments, data model 500 may be comprised of one or more tables. In some embodiments, each table may include one or more attributes for one or more types of data objects. For example, in some embodiments, a data model may have one table for each type of data object. Whereas, in some embodiments, data models may include tables that include attributes for more than one data object type.

Also, in one or more of the various embodiments, users of a visualization platform may be enabled to generate new data object types based on one or more of fields, objects, values, or the like, included in the data model.

In this example, table 502 includes several columns that correspond to record fields of table 502, including, Department Manager (column 504), Executive (column 506), Employee (column 508), Manager (column 510), Employee Title (column 512), Office Location (column 514), or the like.

For example, row 516 includes a record that reveals that C Drigg is a developer that is associated with the Seattle office. And, the record shows that C Drigg's direct manager is F Funge, C Drigg's department head, is S Grand, and that the executive in responsible for C Drigg is G Rudd.

Figure 6:
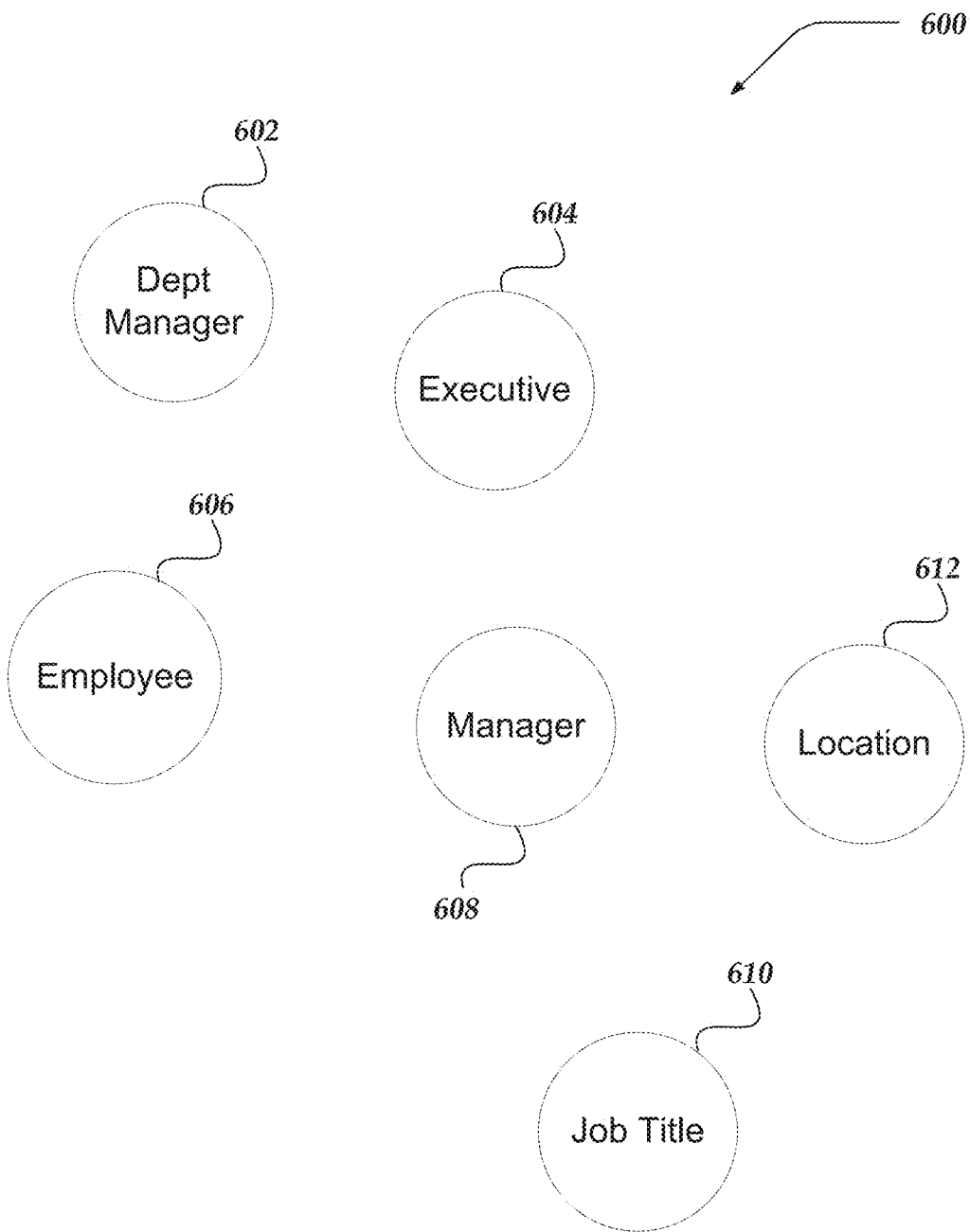
FIG. 6 illustrates a logical representation of a portion of a data model for dynamic graph generation for interactive data analysis in accordance with one or more of the various embodiments.

FIG. 6 illustrates a logical representation of a portion of data model 600 for dynamic graph generation for interactive data analysis in accordance with one or more of the various embodiments. In this example, data model 600 may be considered an abstract view of some of the data objects that may be derived from data model 500. In this example, a modeling engine has provided some data objects based on the columns of table 502 in data model 500. Accordingly, in this example, for some embodiments, the modeling engine has provided data objects that correspond to the columns in table 502, including, Department Manager (data object 602), Executive (data object 604), Employee (data object 606), Manager (data object 608), Employee Job Title (data object 610), Office Location (data object 612), or the like.

In some cases, for one or more of the various embodiments, data model 600 may be sufficient for some organizations or some data analysis efforts. However, in many cases, naively providing data objects based on table columns, or the like, may be disadvantageous for some types of data analysis. At least one disadvantage associated with naive data object generation may be that the generated objects cannot or do not represent one or more concepts that a visualization author is interested showing in a visualization. For example, while data model 500 includes information regarding relationships between various levels or management and employees (org chart information), it does not directly provide the concept of Lead→Report. Accordingly, in this example, data model 600 (and data model 500) enables analysis of persons with reports or persons with leads (e.g., managers, department managers, executives) but it does not have a native mechanism answering a simple query, such as, showing a list of persons and all the employees that are their responsibility. Further, in this example, a data model, such as, data model 500 or data model 600 may be unable to directly represent such as relationship.

Accordingly, conventionally, mismatches between data model shapes and desired visualizations may be accommodated by enabling users to manually provide custom instructions to modify the shape of a data model to force it to provide data objects desired for a particular visualization. However, for some embodiments, generating custom instructions to shape a data model (whether by coded instruction, or GUI inputs) may require high levels of skill, including a deep understanding of the data model.

Figure 7A:
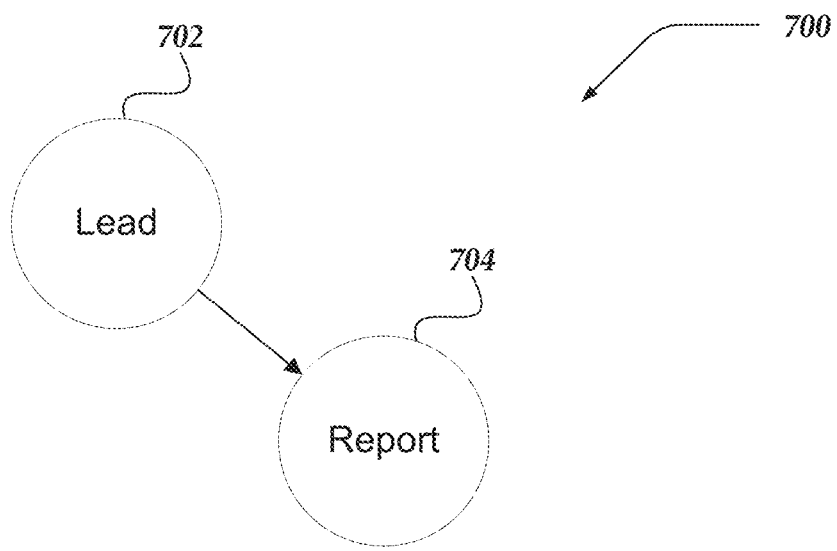
FIG. 7A illustrates a logical representation of a portion of a graph model for dynamic graph generation for interactive data analysis in accordance with one or more of the various embodiments.

FIG. 7A illustrates a logical representation of a portion of graph model 700 for dynamic graph generation for interactive data analysis in accordance with one or more of the various embodiments. As described above, in some embodiments, modeling engines may be arranged to generate graph models from data models. Accordingly, in some embodiments, modeling engines may generate graph models that enable reasoning that may be difficult, unsupported or otherwise obscured by the underlying data model. Further, in one or more of the various embodiments, modeling engines may be arranged to employ one or more automatic operations that enable users to interactively generate or modify graph models to further explore or analyze information associated with a data model.

In this example, graph model 700 includes two graph objects, graph object 702 and graph object 704. In this example, graph object 702 represents organization members that are responsible for one or more other members in the organization. Likewise, in this example, graph object 704 represents organization members (e.g., employees) that are the responsibility of a given lead. By observation, it is apparent that such a common or simple question may be difficult to answer directly from data model 500. Namely, in this example, data model 500 has features that may make it difficult to reason about the Lead→Report relationships in the organization. However, as shown here, rearranging the information using a graph model, such as, graph model 700 makes it trivial to reason about the Lead→Report relationship for the organization.

In conventional systems, users or data administrators may be expected to manually design graph models, such as, graph model 700. However, in practice, most users may be unsuited for performing the data analysis that may be required to design useful graph models. Thus, in many cases, organizations may employ scarce data analysts to design graph models (or data models) that may be directed to expected analysis use cases. This practice may be disadvantageous because of its cost and importantly inflexibility. Scarce data analyst resources may be expended to generate graph models that later fail to be responsive to unforeseen queries. Accordingly, even if a graph model is well designed for a given set of assumptions, changes in the underlying assumptions may render a well designed graph model obsolete.

Figure 7B:
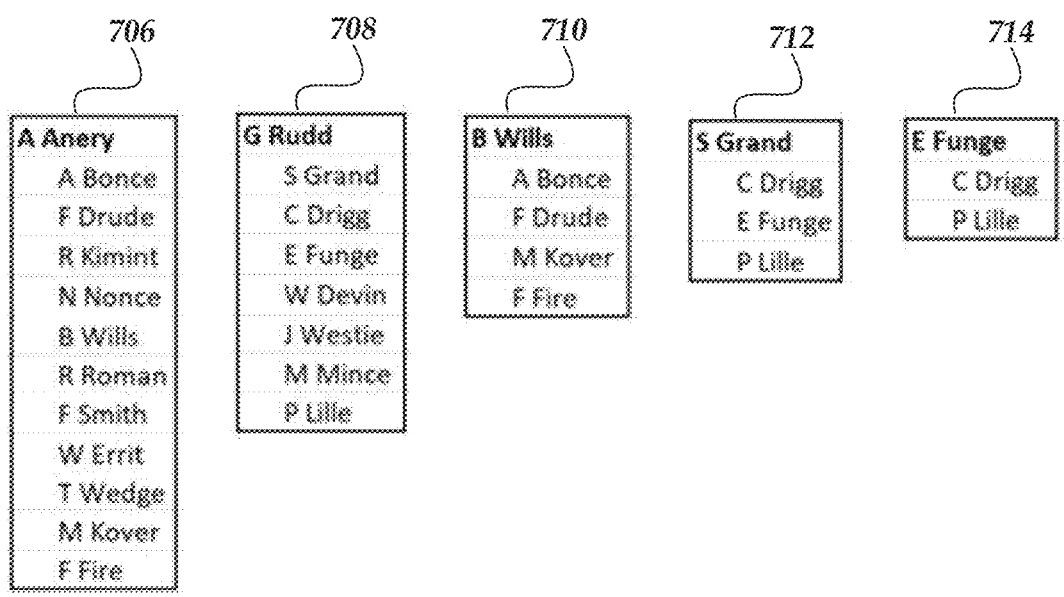
FIG. 7B illustrates a logical representation of results based on a portion of a graph model for dynamic graph generation for interactive data analysis in accordance with one or more of the various embodiments.

FIG. 7B illustrates a logical representation of results based on a portion of graph model 700 for dynamic graph generation for interactive data analysis in accordance with one or more of the various embodiments. For example, for some embodiments, graph model 700 enables various results, all that answer the question "who leads who?" or "who is a person's lead".

In this example, result 706 includes the Lead→Report information for A Anery showing that A Anery is (directly or indirectly) responsible for eleven persons. Similarly, in this example: result 708 includes the Lead→Report information for G Rudd showing that G Rudd is responsible for seven persons; result 710 includes the Lead-Report information for B Wills showing that B Wills is responsible for four persons; result 712 includes the Lead-Report information for S Grand showing that S Grand is responsible for three persons; result 714 includes the Lead-Report information for E Funge showing that E Funge is responsible for two persons; or the like.

While, for this example, the information included in data model 500 is sufficient for generating the results (e.g., result 706), the shape or organization of data model 500 is such that data model 500 obscures the Lead→Report relationships that, in contrast, are easily reasoned about using graph model 700.

Figure 8:
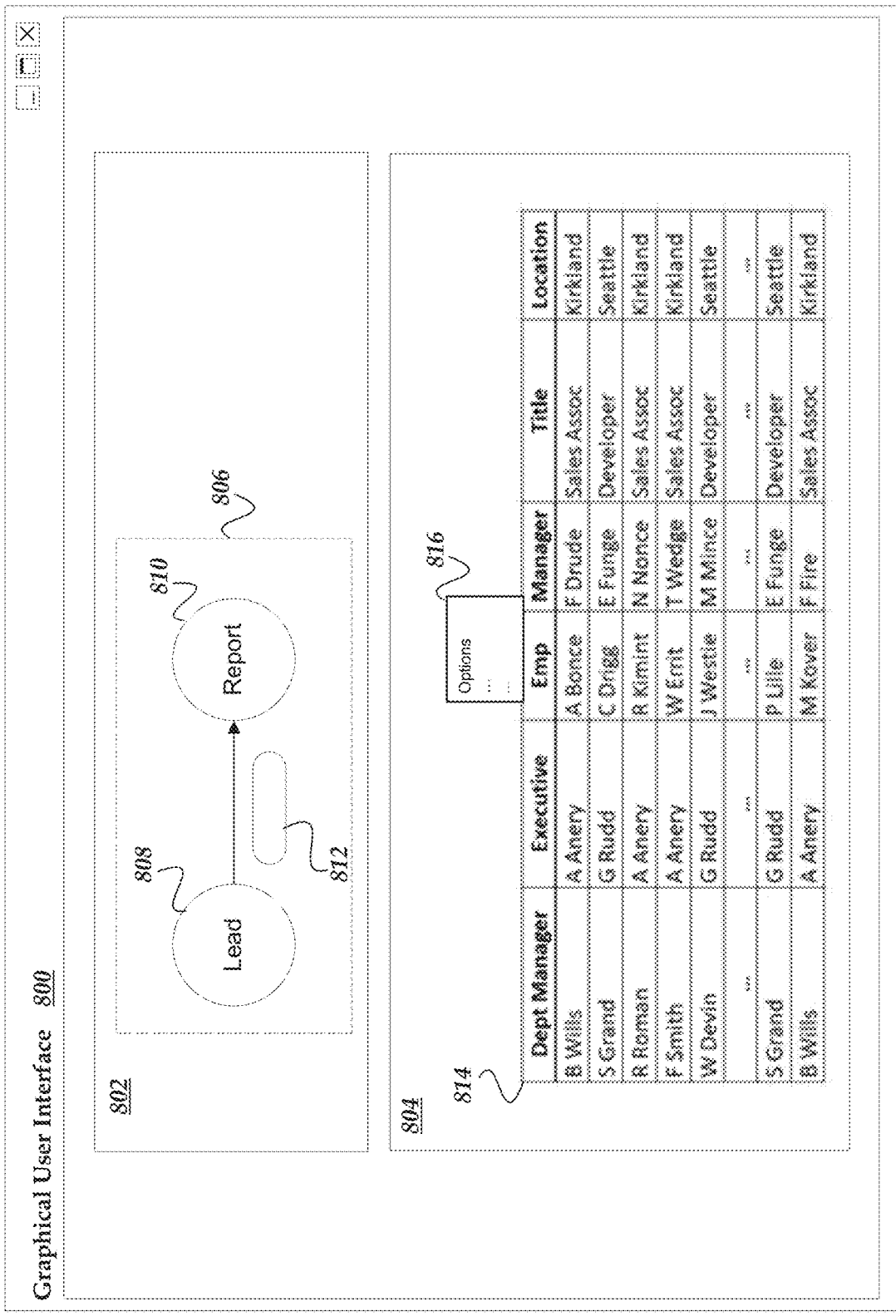
FIG. 8 illustrates a logical representation of a portion of a user interface for dynamic graph generation for interactive data analysis in accordance with one or more of the various embodiments.

FIG. 8 illustrates a logical representation of a portion of user interface 800 for dynamic graph generation for interactive data analysis in accordance with one or more of the various embodiments. In some embodiments, user interface 800 may be arranged to include one or more panels, such as, panel 802, panel 804, or the like.

In one or more of the various embodiments, user interface 800 may be displayed on one or more hardware displays, such as, client computer displays, mobile device displays, or the like. In some embodiments, user interface 800 may be provided via a native application or as a web application hosted in a web browser or other similar application. One of ordinary skill in the art will appreciate that for at least clarity or brevity many details commons to production user interfaces have been omitted from user interface 800. Likewise, in some embodiments, user interfaces may be arranged differently than shown depending on local circumstances. However, one of ordinary skill in the art will appreciate that the disclosure/description of user interface 800 is at least sufficient for disclosing the innovations included herein.

In this example, panel 802 is employed to display portions of a graph model that may be generated by a modeling engine. In this example, graph model 806 may be considered to be the similar to graph model 700 described in FIG. 7. Accordingly, in one or more of the various embodiments, graph object 808 representing organization members that are leads and graph object 810 may represent the organization members that report to a particular lead member. Further, in this example, widget 812 represents or references information related to the relationship between graph object 808 and graph object 810.

In this example, panel 804 is employed to display portions of data model 814. In this example, data model 814 may be considered similar to data model 500 in FIG. 5. However, in some embodiments, user interfaces may be arranged to enable interactive analysis of included data models. In this example, menu 816 represents one of many interactive user interface controls that may be included in a user interface, such as, user interface 800. In this example, menu 816 may be considered similar to a tool-tip, pop-up menu, fly-out menu, or other interactive user interface control. Accordingly, in some embodiments, user interface controls, such as, menu 816 may be automatically activated in response to one or more interactions or inputs that may be associated with the information included in data model 814. For example, in some embodiments, as users select parts (e.g., columns) of data model 814, modeling engines may be arranged to display one or more user interface controls populated with relevant or context sensitive information, options, or recommendations.

Likewise, in some embodiments, panel 802 may be arranged to enable interactive inputs. Accordingly, in one or more of the various embodiments, as users interact with the various graph objects or other user interface controls, modeling engines may be arranged provide one or more user interface controls (e.g., similar to menu 816) that provide context sensitive information, options, recommendations, or the like. For example, selecting widget 812 may cause a modeling engine to generate a menu that enables a user to activate or deactivate one or more filters that may be applied to the relationship between graph object 808 and graph object 810.

Accordingly, in one or more of the various embodiments, modeling engines may be arranged to employ one or more data transform models or graph transform models to determine one or more of the user interface controls to enable/display. Likewise, in some embodiments, modeling engines may be arranged to employ the one or more data transform models or the graph transform models to determine some or all of the content (e.g., menu items) to include in the one or more of the user interface controls.

In one or more of the various embodiments, data model features, graph model features, selected data objects, selected filters, selected theme information, user role information, or the like, may be evaluated or otherwise considered by the one or more transform models. Further, in one or more of the various embodiments, transform models may be classified or categorized based on various features of the data model. Accordingly, in some embodiments, modeling engines may be arranged to select eligible transform models based on one or more characteristics of the data model or graph model. For example, in some embodiments, data model 500 has a tabular database-like shape, thus transform models designed for evaluating rows, columns, and so on, may be selected to analyze interaction information associated with data model 814. In contrast, for example, if the data model of interest is based on XML, or the like, one or more data transform models suitable or eligible for tabular data models may be automatically excluded from consideration in favor of one or more transform models that are arranged to process XML data structures.

Figure 9:
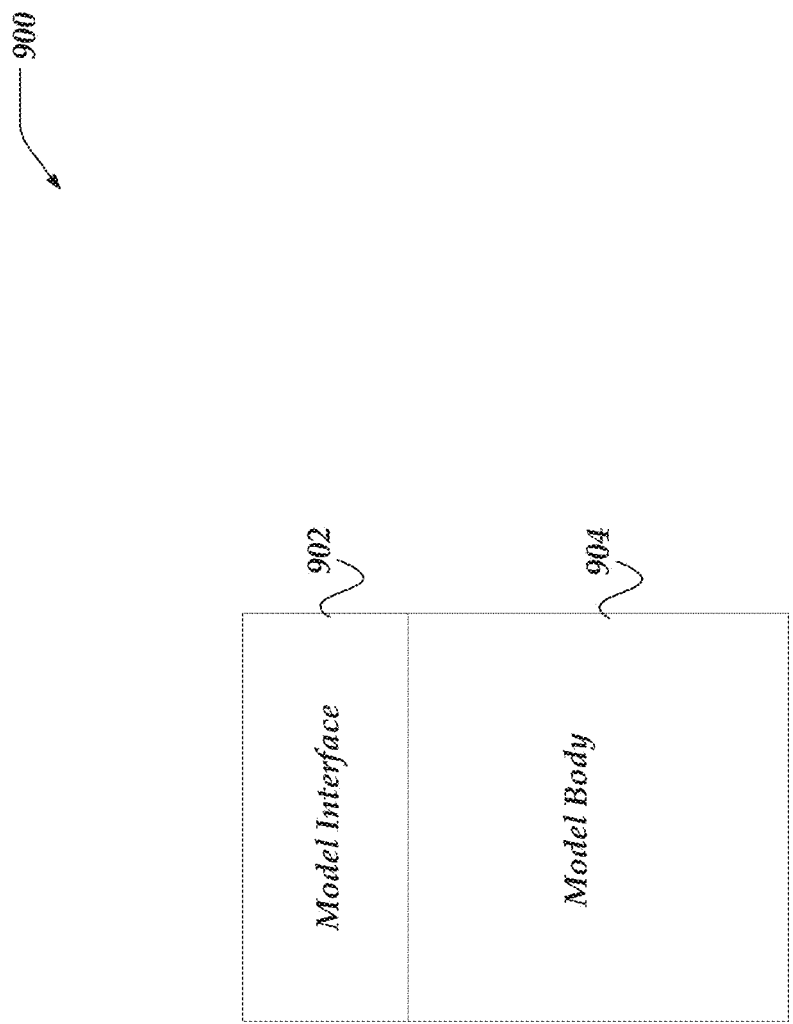
FIG. 9 illustrates a logical schematic of a transform model for dynamic graph generation for interactive data analysis in accordance with one or more of the various embodiments.

FIG. 9 illustrates a logical schematic of transform model 900 for dynamic graph generation for interactive data analysis in accordance with one or more of the various embodiments. As described above, modeling engines may be arranged to employ one or more data transform models or one or more graph transform models that may be arranged to perform various actions based on interactions with data models or graph models in an interactive user interface.

In one or more of the various embodiments, described generally, transform model 900 may represent data transform models or graph transform models. In some embodiments, transform models may be considered data structures that include, reference, or encapsulate one or more components, such as, computer readable instructions, conditions, configuration information, one or more sub-models, or the like.

Further, in one or more of the various embodiments, transform models may employ heuristics, machine-learning, pattern-matching, historical behavior information, user feedback, or the like, or combination thereof, to determine if one or more transformations may be available.

In one or more of the various embodiments, data transform models, may include transform models that may be arranged to transform data objects or other information associated with a data model. In some cases, data transformations may automatically generate or modify graph objects or graph models. In other cases, data transformations may modify or annotate the data model rather than modifying a graph model. Also, in some embodiments, a transform model may be considered both a data transform model or a graph transform model.

Herein, for some embodiments, at least one distinction between data transform models and graph transform models may be based on the source of inputs to the transform model. Accordingly, in some embodiments, transform models that may be arranged to ingest input values associated with a data model may be considered data transform models while transform models that may be arranged to ingest input values associated with a graph model may be considered graph transform models.

In one or more of the various embodiments, the different between data transform models and graph transform models may be arbitrary. However, herein, they are described separately to help distinguish the types or source of the input information that may be applied.

In one or more of the various embodiments, transform models, such as, transform model 900 may be arranged to include one or more interfaces, such as, model interface 902. Also, in some embodiments, transform models, such as, transform model 900 may be arranged to include at least one model body, such as, model body 904.

In one or more of the various embodiments, as a modeling engine may provide input information associated with one or more interactions, the modeling engine may be arranged to compare the input information to the model interfaces of one or more transform models. Accordingly, in some embodiments, one or more transform models that have model interfaces that may be consistent or compatible with the input information may be determined.

In one or more of the various embodiments, modeling engines may be arranged to employ one or more of the consistent/compatible transform models to evaluate the input information. Accordingly, in one or more of the various embodiments, transform models execute one or more transformations based on the input information provided via a model interface, such as, model interface 902. Thus, in some embodiments, heuristics, conditions, instructions, machine-learning models, or the like, associated with a model body, such as, model body 904 may be employed to perform or recommend one or more transformations that may be executed on the data model or graph model.

Figure 10:
FIG. 10 illustrates a logical schematic of portions of transform models for dynamic graph generation for interactive data analysis in accordance with one or more of the various embodiments.

FIG. 10 illustrates a logical schematic of portions of transform models 1000 for dynamic graph generation for interactive data analysis in accordance with one or more of the various embodiments. In this example, data transform model 1002 and data transform model 1004 represent one or more embodiments of transform models that may be employed by modeling engines for determining or execution one or more transformations to data models.

Here, in this example, data transform model 1002 includes model interface 1006 and model body 1018. Similarly, in this example, for some embodiments, data transform model 1004 includes model interface 1010 and model body 1012.

In this example, for some embodiments, model interface 1006 shows that data transform model 1002 is expecting inputs provided by a tupleSource that may be destined for a specified target. Here in this example, model interface 1006 specifies a target that is associated with graph nodes (e.g., graph models).

Further, in this example, for some embodiments, model body 1008 specifies one or more operations that may be performed if the requirements of model interface 1006 may be met by the provided input information. In this example, a reference to function called 'addNodesFromTuples' indicates that data transform model 1002 may be arranged to accept a set of qualified tuples and generated one or more nodes in graph model assuming the various predicates or limitations that may be defined in the model body implementation may be satisfied.

In this example, for one or more of the various embodiments, data transform model 1004 may be considered similar to data transform model 1002, in that has a model interface and a model body. However, the differences between model interface 1006 and model interface 1010 distinguish the two data transform models from each other. Similarly, in this example, model body 1008 and model body 1012 include differences that distinguish data transform model 1002 from data transform model 1004. Namely, in this example, model interface 1010 specifies that valid inputs to data transform model 1004 should be from a property source (e.g., prop) rather than tuples. Likewise, in this example, model body 1012 specifies that the transformation may include generating nodes (e.g., graph objects) based on selected/provided properties of a data object rather than from the data object as whole.

Generalized Operations

FIGS. 11-15 represent generalized operations for dynamic graph generation for interactive data analysis in accordance with one or more of the various embodiments. In one or more of the various embodiments, processes 1100, 1200, 1300, 1400, and 1500 described in conjunction with FIGS. 11-15 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 11-15 may be used for dynamic graph generation for interactive data analysis in accordance with at least one of the various embodiments or architectures such as those described in conjunction with FIGS. 4-10. Further, in one or more of the various embodiments, some or all of the actions performed by processes 1100, 1200, 1300, 1400, and 1500 may be executed in part by modeling engine 322, visualization engine 324, data provider 326 running on one or more processors of one or more network computers.

Figure 11:
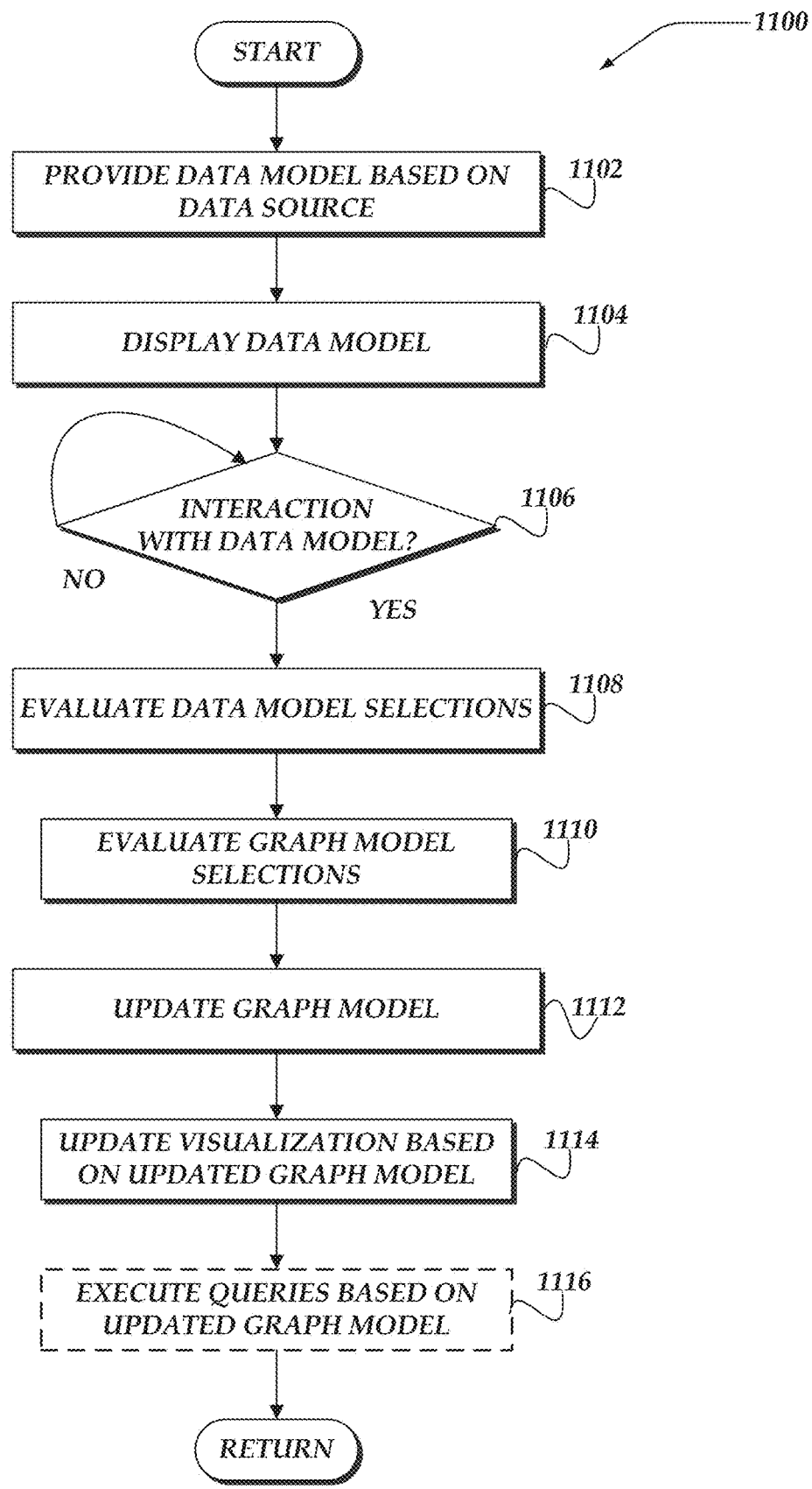
FIG. 11 illustrates an overview flowchart for a process for dynamic graph generation for interactive data analysis in accordance with one or more of the various embodiments.

FIG. 11 illustrates an overview flowchart for process 1100 for dynamic graph generation for interactive data analysis in accordance with one or more of the various embodiments. After a start block, at block 1102, in one or more of the various embodiments, a data model based on a data source may be provided to a visualization platform At block 1104, in one or more of the various embodiments, the visualization platform may be arranged to display the data model. In some embodiments, the visualization platform may generate a user interface that includes a visualization panel. In some embodiments, the visualization panel may be employed to display one or more portions of the data model.

At decision block 1106, in one or more of the various embodiments, if there may one or more interactions with the data model, control may flow to block 1108; otherwise, control may loop back to decision block 1106. In one or more of the various embodiments, interactions with a user interface that includes a graph panel or a visualization panel may be provide input information. In some embodiments, if input information is provided, the visualization platform may perform one or more additional actions in response to the input information.

At block 1108, in one or more of the various embodiments, a modeling engine may be arranged to evaluate one or more data model portions that may be associated with the input information. In one or more of the various embodiments, modeling engines may be arranged to employ one or more data transform models to evaluate the input information associated with the one or more data model portions.

At block 1110, in one or more of the various embodiments, the modeling engine may be arranged to evaluate one or more graph model portions that may be associated with the input information. In one or more of the various embodiments, modeling engines may be arranged to employ one or more graph transform models to evaluate the input information associated with the one or more graph model portions.

At block 1112, in one or more of the various embodiments, the modeling engine may be arranged to update the graph model based on the input information. In one or more of the various embodiments, modeling engines may be arranged to employ one or more graph transform models to determine modifications to the graph model, if any.

At block 1114, in one or more of the various embodiments, the modeling engine may be arranged to update one or more visualizations based on the updated graph models. In some embodiments, these updates may be updates to a visualization of the graph model itself (e.g., panel 802 in FIG. 8), the data model (e.g., panel 804 in FIG. 8), or other visualizations that may depend on the graph model.

At block 1116, in one or more of the various embodiments, optionally, the modeling engine may be arranged to accept and execute one or more queries that may be directed to the graph model. Accordingly, in one or more of the various embodiments, the queries may be executed based on the graph model. Values associated with the results of the query may be provided based the data model.

Next, in one or more of the various embodiments, control may be returned to a calling process.

Figure 12:
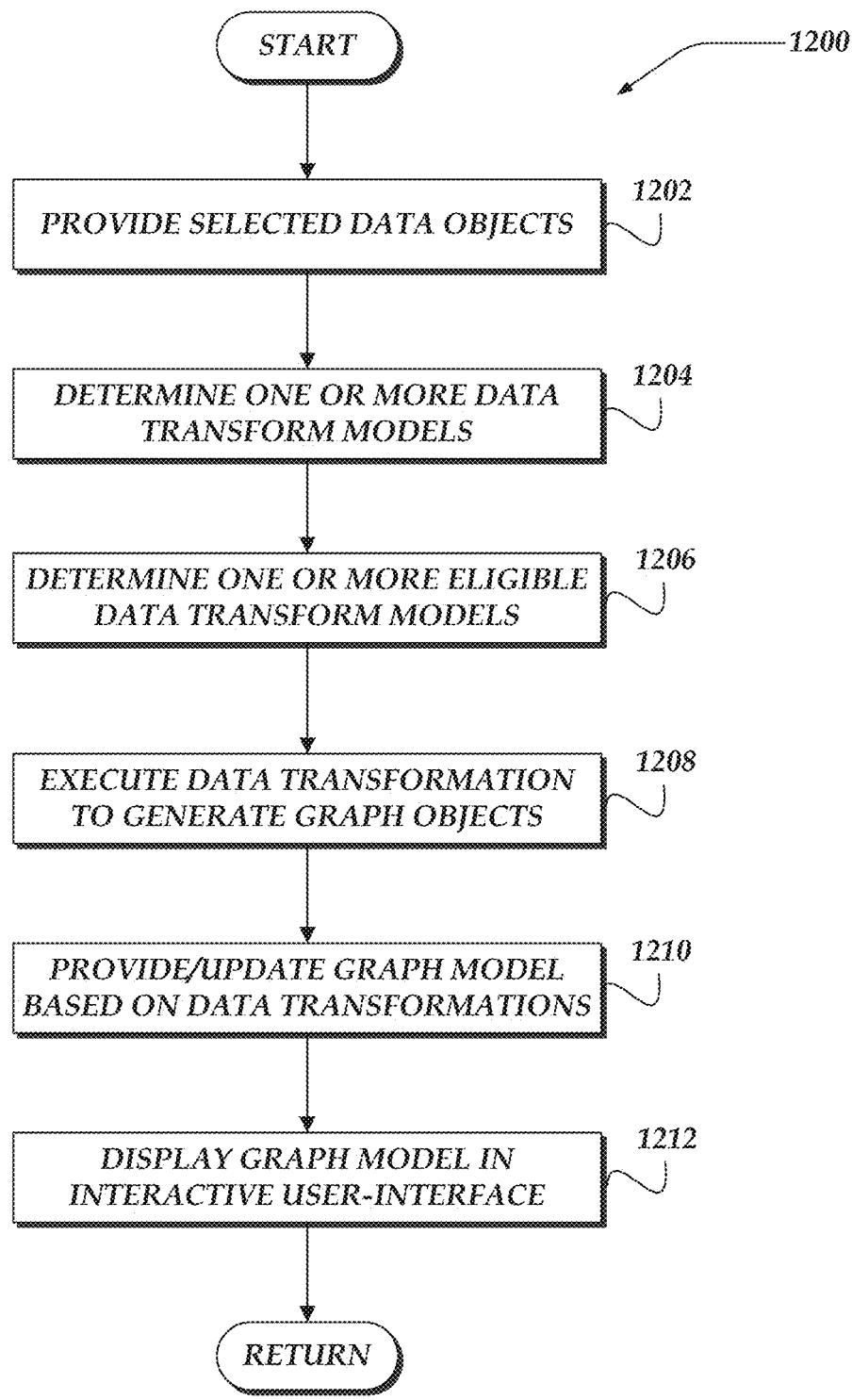
FIG. 12 illustrates a flowchart for a process for dynamic graph generation for interactive data analysis in accordance with one or more of the various embodiments.

FIG. 12 illustrates a flowchart for process 1200 for dynamic graph generation for interactive data analysis in accordance with one or more of the various embodiments. After a start block at block 1202, in one or more of the various embodiments, one or more selected data objects may be provided to a modeling engine. As described above, one or more portions of a data model may be displayed in an interactive user interface. Accordingly, in one or more of the various embodiments, one or more data objects in the data model may be selected based on one or more interaction inputs. In some embodiments, rather than being limited to whole data objects, the selected information may include one or more properties or attributes comprising or associated with one or more data objects.

In one or more of the various embodiments, data objects may be selected based on one or more direct interactions with the data model. For example, in some embodiments, a user may be enabled to select one or more columns from a table based data model. Likewise, in other embodiments, a user may be enabled to select one or more elements, attributes, fields, or the like from non-tabular data models.

In one or more of the various embodiments, modeling engines may be arranged to aggressively over select the one or more data object based on given interactions. Likewise, in some embodiments, modeling engines may be arranged to include one or more data objects that may be related to explicitly selected data object. For example, in some embodiments, the modeling engine may be arranged to recognize one or more associations between data objects that may be hidden or obscured from a user.

In one or more of the various embodiments, various interactions, such as, point selections, area selections, grouping, tagging, marking, or the like, may be associated with one or more static or dynamic filters, rules, or the like, that may determine which data objects to provide to the modeling engine. Accordingly, in some embodiments, modeling engine may be arranged to employ rules, instructions, filters, pattern matching, or the like, provided via configuration information to enable an organization to adapt or modify selection behavior based on local circumstances. For example, in some embodiments, selection behavior may be adjusted depending on the input characteristics of the computer or device used to display user interface.

At block 1204, in one or more of the various embodiments, the modeling engine may be arranged to determine one or more data transform models. As described above, visualization platforms may include a collection of data transform models that may be employed to process interaction input information.

In one or more of the various embodiments, modeling engines may be arranged to provide the one or more data transform models based on various criteria. Accordingly, in some embodiments, one or more data transform models may be restricted to particular data models, users, customers, locations, or the like. For example, in some embodiments, modeling engines may be arranged to employ rules, instructions, filters, or the like, provided via configuration information to make an initial determination of data transform models.

In one or more of the various embodiments, modeling engines may be arranged to select all available data transform models as a default. For example, in some embodiments, there may be a few data transform models such that testing them all for eligibility (see below) may be of no concern.

At block 1206, in one or more of the various embodiments, the modeling engine may be arranged to determine one or more eligible data transform models based on the data model, the one or more data transform models, or the like. As described above, data transform models may be arranged to include a model interface that may specify one or more characteristics of acceptable/expected inputs.

Accordingly, in some embodiments, modeling engines may be arranged to compare the model interfaces of the available data transform models to determine if there may be one or more eligible data transform models that match the input information, such as, the selected data objects, or the like.

In one or more of the various embodiments, modeling engines or data transform models may be arranged to such that a common interface may be employed. Accordingly, in some embodiments, the input information (e.g., selected data object, or the like) may be provided to each of the determined one or more data transform models. Thus, in some embodiments, the respective data transform models may be arranged to interrogate or evaluate the provided input information to determine they may be eligible for performing a data transformation.

Also, in some embodiments, the determination of data transform model eligibility may be combination of actions performed by the modeling engine or the individual data transform models themselves. Accordingly, in some embodiments, data transform models may be arranged to reject input information or otherwise disqualify themselves from being used to execute transformations.

At block 1208, in one or more of the various embodiments, the modeling engine may be arranged to execute one or more of the data transformations. In some embodiments, the one or more or more data transformations may include generating one or more graph objects. As described above, data transform models include a model body that specifies one or more actions that may constitute one or more data transformations. Accordingly, in some embodiments, the modeling engine may be arranged to execute one or more actions as specified by one or more data transform models. Also, in some embodiments, one or more data transformations may be comprised of one or more sub-transformations.

In some embodiments, different transformations associated with different data transform models may be executed. For example, in some embodiments, one or more data transformation models may provide a pipeline of chained or related transformations based on the input information. In some embodiments, modeling engines may employ configuration information to determine dependencies or relationships among different transform models. Likewise, in some embodiments, data transform models may embed dependency information that may be employed to determine if additional or related data transform models should be applied.

In some embodiments, one or more data transform models may be associated with one or more graph transform models such that executing transformation for one or more data transform models may trigger or require the execution of transformations for one or more graph transform models or other data transform models.

In one or more of the various embodiments, data transformations may include scanning a data model for data objects matching specific criteria. Accordingly, in some embodiments, data model information may be transformed into graph model information.

At block 1210, in one or more of the various embodiments, the modeling engine may be arranged to provide a graph model based on the one or more data transformations. In some embodiments, one or more of the data transformations may produce a new graph model or one or more modifications to an existing graph model. In some embodiments, one or more graph objects may be created or modified. Likewise, in some embodiments, one or more relationships between two or more graph objects may be created or modified.

At block 1212, in one or more of the various embodiments, the visualization platform may be arranged to display the graph model in an interactive user interface. In one or more of the various embodiments, if a new graph model may have been created or an existing graph model has been modified, a visualization engine in the visualization platform may be arranged to update the user interface to show the new or updated graph model.

Next, in one or more of the various embodiments, control may be returned to a calling process.

Figure 13:
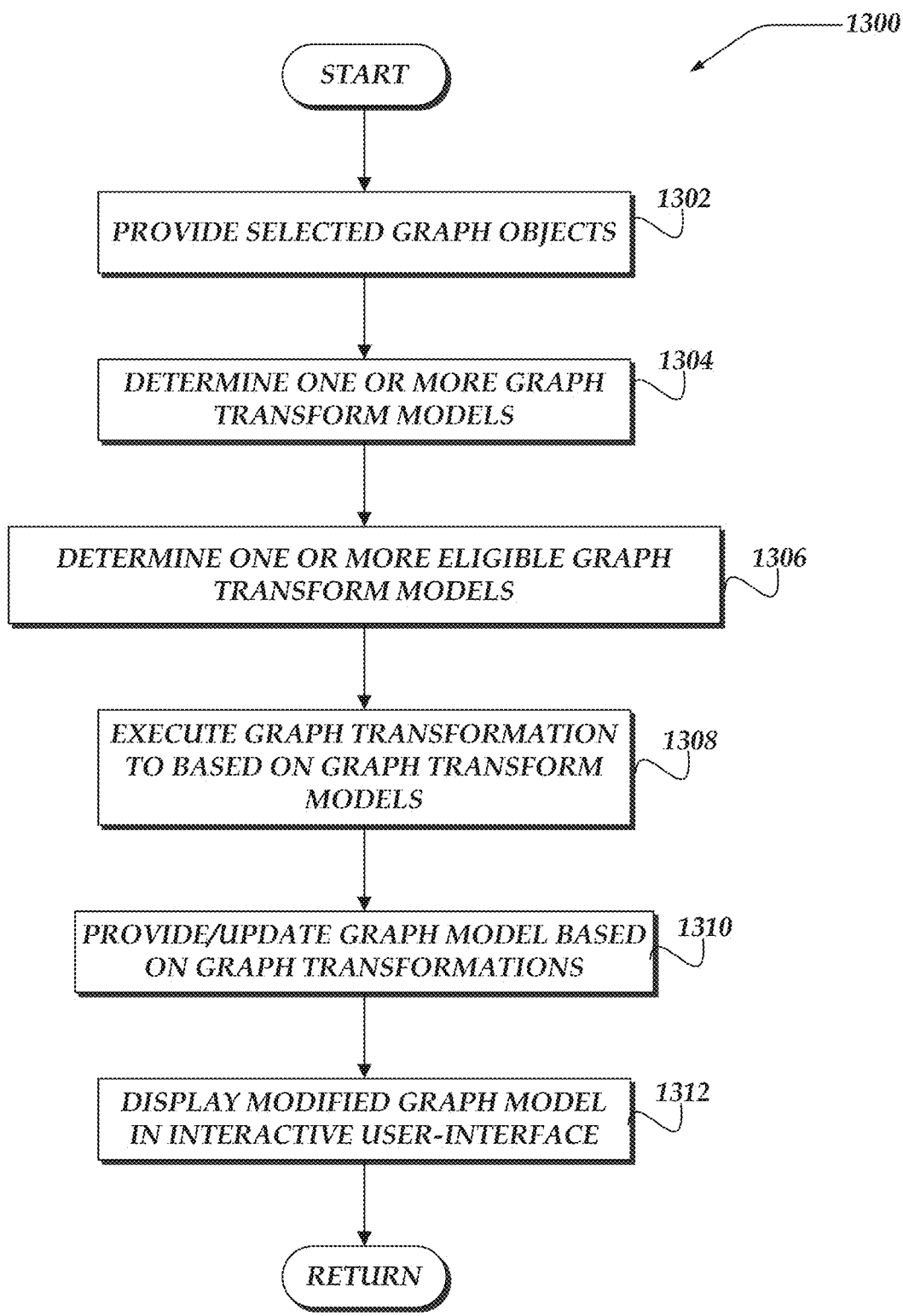
FIG. 13 illustrates a flowchart for a process for dynamic graph generation for interactive data analysis in accordance with one or more of the various embodiments.

FIG. 13 illustrates a flowchart for process 1300 for dynamic graph generation for interactive data analysis in accordance with one or more of the various embodiments. In some embodiments, process 1300 may be considered similar to process 1200 described above. However, process 1300 is focused on activity associated with interactive inputs directed towards a graph model rather than a data model. After a start block at block 1302, in one or more of the various embodiments, one or more selected graph objects may be provided to a modeling engine. As described above, one or more graph objects, graph object properties, graph object relationships, or the like, may be determined to be selected based on one or more interactive inputs.

Accordingly, in one or more of the various embodiments, one or more graph objects in the graph model may be selected based on one or more interaction inputs. In some embodiments, rather than being limited to whole graph objects, the selected information may include one or more properties or attributes comprising or associated with one or more graph objects.

In one or more of the various embodiments, graph objects may be selected based on one or more direct interactions with the graph model. For example, in some embodiments, a user may be enabled to select one or more columns from a table based graph model. Likewise, in other embodiments, a user may be enabled to select one or more elements, attributes, fields, or the like from non-tabular graph models.

In one or more of the various embodiments, modeling engines may be arranged to aggressively over select the one or more graph object based on given interactions. Likewise, in some embodiments, modeling engines may be arranged to include one or more graph objects that may be related to explicitly selected graph object. For example, in some embodiments, the modeling engine may be arranged to recognize one or more associations between graph objects that may be hidden or obscured from a user.

In one or more of the various embodiments, various interactions, such as, point selections, area selections, grouping, tagging, marking, or the like, may be associated with one or more static or dynamic filters, rules, or the like, that may determine which graph objects to provide to the modeling engine. Accordingly, in some embodiments, modeling engine may be arranged to employ rules, instructions, filters, pattern matching, or the like, provided via configuration information to enable an organization to adapt or modify selection behavior based on local circumstances. For example, in some embodiments, selection behavior may be adjusted depending on the input characteristics of the computer or device used to display user interface.

At block 1304, in one or more of the various embodiments, the modeling engine may be arranged to determine one or more graph transform models. As described above, visualization platforms may include a collection of graph transform models that may be employed to process interaction input information.

In one or more of the various embodiments, modeling engines may be arranged to provide the one or more graph transform models based on various criteria. Accordingly, in some embodiments, one or more graph transform models may be restricted to particular graph models, data models, users, customers, locations, or the like. For example, in some embodiments, modeling engines may be arranged to employ rules, instructions, filters, or the like, provided via configuration information to make an initial determination of graph transform models.

In one or more of the various embodiments, modeling engines may be arranged to select all available graph transform models as a default. For example, in some embodiments, there may be a few graph transform models such that testing them all for eligibility (see below) may be of no concern.

At block 1306, in one or more of the various embodiments, the modeling engine may be arranged to determine one or more eligible graph transform models based on the graph model, the one or more graph transform models, the underlying data model, or the like. As described above, graph transform models may be arranged to include a model interface that may specify one or more characteristics of acceptable/expected inputs.

Accordingly, in some embodiments, modeling engines may be arranged to compare the model interfaces of the available graph transform models to determine if there may be one or more eligible graph transform models that match the input information, such as, the selected graph objects, or the like.

In one or more of the various embodiments, modeling engines or graph transform models may be arranged to such that a common interface may be employed. Accordingly, in some embodiments, the input information (e.g., selected graph object, or the like) may be provided to each of the determined one or more graph transform models. Thus, in some embodiments, the respective graph transform models may be arranged to interrogate or evaluate the provided input information to determine they may be eligible for performing a graph transformation.

Also, in some embodiments, the determination of graph transform model eligibility may be combination of actions performed by the modeling engine or the individual graph transform models themselves. Accordingly, in some embodiments, graph transform models may be arranged to reject input information or otherwise disqualify themselves from being used to execute transformations.

At block 1308, in one or more of the various embodiments, the modeling engine may be arranged to execute one or more of the graph transformations. In some embodiments, the one or more or more graph transformations may include generating one or more graph objects. As described above, graph transform models include a model body the specifies one or more actions that may constitute one or more graph transformations. Accordingly, in some embodiments, the modeling engine may be arranged to execute one or more actions as specified by one or more graph transform models. Also, in some embodiments, one or more graph transformations may be comprised of one or more sub-transformations.

In some embodiments, different transformations associated with different graph transform models may be executed. For example, in some embodiments, one or more graph transformation models may provide a pipeline of chained or related transformations based on the input information.

In some embodiments, modeling engines may employ configuration information to determine dependencies or relationships among different transform models. Likewise, in some embodiments, graph transform models may embed dependency information that may be employed to determine if additional or related graph transform models should be applied.

In some embodiments, one or more graph transform models may be associated with one or more graph transform models such that executing transformations for one or more graph transform models may trigger or require the execution of transformations for one or more graph transform models or other graph transform models.

In one or more of the various embodiments, graph transformations may include scanning a graph model for graph objects matching specific criteria. Accordingly, in some embodiments, graph model information may be transformed into graph model information.

At block 1310, in one or more of the various embodiments, the modeling engine may be arranged to provide a graph model based on the one or more graph transformations. In some embodiments, one or more of the graph transformations may produce one or more modifications to an existing graph model. In some embodiments, one or more graph objects may be created or modified. Likewise, in some embodiments, one or more relationships between two or more graph objects may be created or modified.

At block 1312, in one or more of the various embodiments, the visualization platform may be arranged to display the graph model in an interactive user interface. In one or more of the various embodiments, if an existing graph model has been modified, a visualization engine in the visualization platform may be arranged to update the user interface to show the updated graph model.

Next, in one or more of the various embodiments, control may be returned to a calling process.

Figure 14:
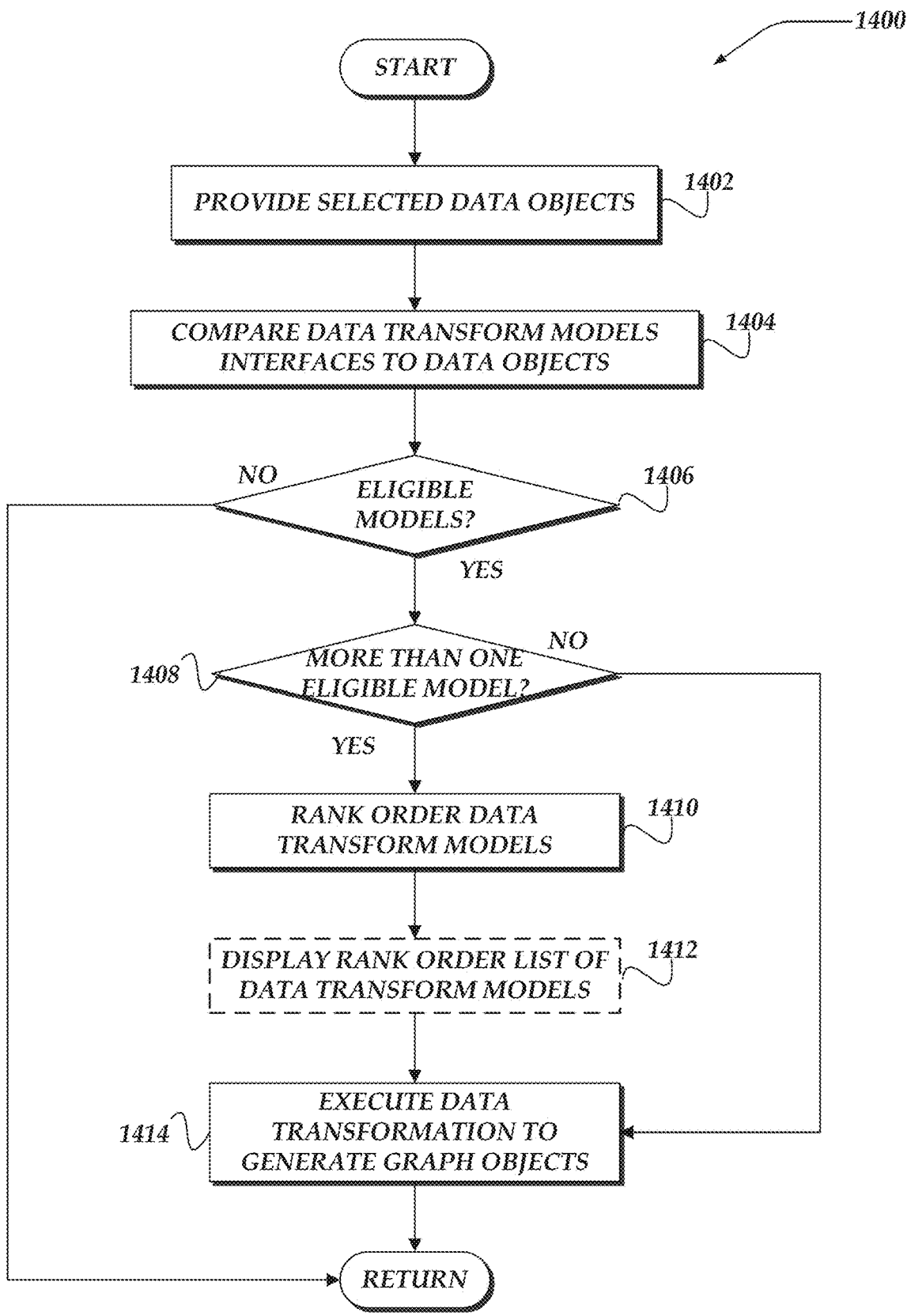
FIG. 14 illustrates a flowchart for a process for dynamic graph generation for interactive data analysis in accordance with one or more of the various embodiments.

FIG. 14 illustrates a flowchart for process 1400 for dynamic graph generation for interactive data analysis in accordance with one or more of the various embodiments. After a start block, at block 1402, in one or more of the various embodiments, one or more selected data objects may be provided to a modeling engine. As described above, interactive input information that includes or references one or more data objects or data object properties may be determined based on the interactive input information.

At block 1404, in one or more of the various embodiments, the modeling engine may be arranged to compare one or more data transform model interfaces to the selected data objects or the interactive input information. As described above, data transform models include model interfaces that may be arranged to specify how or what information may be passed to a data transform model.

In one or more of the various embodiments, model interfaces may specify input type information, input source information, user/role requirements, or the like. In some embodiments, model interfaces may be considered similar to a function signature that a compiler or linker may evaluate to determine if a function defined in a library is callable. For example, if the function signature for an API requires two integers and one floating number, attempts to call that function with two string parameters is unlikely to recognized as a valid call.

Accordingly, in one or more of the various embodiments, model interfaces may at once define the necessary input parameters for a data transform model as well as enabling modeling engines to determine if a given transform model may be eligible to process provided interactive inputs.

Further, in one or more of the various embodiments, model interfaces may be arranged to specify additional constraints or requirements to determine if corresponding data transform models may be eligible in a given circumstance. For example, in some embodiments, model interfaces may include value based constraints as well as type based constraints. Accordingly, for example, a model interface may specify a require type or a range of acceptable values.

In one or more of the various embodiments, model interfaces may be arranged to execute various computer readable instructions, condition checks, pattern matching, or the like, provided via configuration information. Accordingly, in some embodiments, data model transforms or their model interfaces may be modified or adapted to local circumstances.

At decision block 1406, in one or more of the various embodiments, if one or more eligible data transform models may be determined, control may flow to decision block 1408; otherwise, control may be returned to a calling process.

In some embodiments, all data transform models may be considered or determined ineligible even though one or more data objects may have been selected based on interactive inputs. Accordingly, in one or more of the various embodiments, visualization platforms may be arranged to provide a user a cue (e.g., visual or audio) that the current selection will not result in a data transformation. Generally, this indicates that the current selection cannot be mapped to a data transform model. In one or more of the various embodiments, a remedy may include modifying the selection, modifying one or more data transform models, adding or activating one or more data transform models.

At decision block 1408, in one or more of the various embodiments, if there is more than one eligible data transform model, control may flow to block 1510; otherwise, control may flow to block 1514. In some embodiments, two or more data transform models may be determined to be eligible. For example, if the model interfaces for two or more different data transform models may be satisfied by the current input information the two or more different data transform models may be selected here.

At block 1410, in one or more of the various embodiments, the modeling engine may be arranged to rank order two or more data transform models. In one or more of the various embodiments, as described above, data transform models may be associated with scores that may be employed to weight the two or more data transform models against each other.

In one or more of the various embodiments, data transform models may be associated with one or more other scores, such as, priority scores, quality of match scores, confidence scores, quantitized scores (e.g., high, med, low, etc.), compound scores generated based on a formula, or the like. Accordingly, in one or more of the various embodiments, modeling engines may be arranged to rank the two or more data transform models based on the one or more ranking scores.

At block 1412, in one or more of the various embodiments, optionally, the modeling engine may be arranged to display the rank ordered list of data transform models. In some embodiments, visualization platforms may be arranged to display a popup menu, or the like, that enables a user to see some or all of the rank ordered list. Accordingly, in some embodiments, the user may be enabled to manually select a lower-ranked transformation over a higher ranked transformation. Also, in some embodiments, modeling engines may be arranged to employ the top-ranked transformation if a user does not make a selection or confirmation.

Likewise, in one or more of the various embodiments, modeling engines may be arranged to require affirmative selections/confirmations by users before particular transformations may be executed. Thus, in some embodiments, even if a transformation is the top ranked transformation, in some cases, the modeling engine may require express confirmation before executing the transformation.

In some embodiments, requiring express confirmation may depend on one or more values, such as, confidence scores, impact scores, or the like. In some embodiments, modeling engines may be arranged to employ rules, instructions, or the like, provided via configuration information to adapt or modify express confirmation requirements based on local circumstances.

Note, for some embodiments, this step may be optional because in some cases, the modeling engine may be arranged to automatically select a data transform model from among the rank ordered list of data transform models without displaying a list to a user.

At block 1414, in one or more of the various embodiments, the modeling engine may be arranged to execute one or more graph transformation on the graph model based on one or more graph transform models. As described above, each data transform model may include a model body that includes computer readable instructions, computer readable data, or the like. In some embodiments, model bodies may include references to computer readable instructions, libraries, plugins, or services that may be employed to execute a data transformation.

In one or more of the various embodiments, two or more data transformations may be executed. In some embodiments, two or more data transformations may be independent enabling the two or more data transformations to be executed simultaneously or concurrently.

In one or more of the various embodiments, modeling engines may be arranged to perform one or more actions based on the specifications included by or referenced by the model bodies that correspond to the determined data transform models.

In some embodiments, if two or more data transform models have been determined to be eligible, the corresponding transformations may be attempted, one after the other, until a first transformation has executed successfully. Accordingly, in some embodiments, modeling engines may try each data transform model in order until the first one has performed its transformation. Thus, in one or more of the various embodiments, each eligible data transform models may attempt a data transformation until the first one succeeds.

Accordingly, in one or more of the various embodiments, modeling engines may be arranged to rely on the data transform model to be the final arbiter with respect to if a transformation may occur. In some embodiments, one or more data transform models may be arranged to apply other/additional input beyond the interactive input information (e.g., the selected data objects) that may be provided. In some embodiments, data transform models may be arranged to employ one or more external services to provide or evaluate information that may be relevant to the transformation attempted by the data transform model.

For example, in some embodiments, a data transform model may be arranged to evaluate if a data object may be an employee of an organization rather than a customer. For example, a transformation step may include generating a particular node or relationship in the graph model if the data object represents an employee rather than a customer. In this example, the data transform model may be arranged to submit information (e.g., name, address, or the like) included in the provided data objects to an organization's directory service that can confirm if the email address corresponds to an employee. Thus, in this example, if the data object information represents an employee, the transformation may execute. Or, if the data object information represents a customer the transformation fails enabling a subsequent data transform model to attempt a data transformation.

Note, in one or more of the various embodiments, data transform models may be described as executing or performing actions associated with data transformation. However, in some embodiments, the modeling engine may be arranged to execute one or more actions on behalf of data transform models based on information (e.g., instructions) included in the data transform models.

Next, in one or more of the various embodiments, control may be returned to a calling process.

FIG. 14 illustrates a flowchart for process 1400 for dynamic graph generation for interactive data analysis in accordance with one or more of the various embodiments. After a start block, at block 1402, in one or more of the various embodiments, one or more selected data objects may be provided to a modeling engine. As described above, interactive input information that includes or references one or more data objects or data object properties may be determined based on the interactive input information.

At block 1404, in one or more of the various embodiments, the modeling engine may be arranged to compare one or more data transform model interfaces to the selected data objects or the interactive input information. As described above, data transform models include model interfaces that may be arranged to specify how or what information may be passed to a data transform model.

In one or more of the various embodiments, model interfaces may specify input type information, input source information, user/role requirements, or the like. In some embodiments, model interfaces may be considered similar to a function signature that a compiler or linker may evaluate to determine if a function defined in a library is callable. For example, if the function signature for an API requires two integers and one floating number, attempts to call that function with two string parameters is unlikely to recognized as a valid call.

Accordingly, in one or more of the various embodiments, model interfaces may at once define the necessary input parameters for a data transform model as well as enabling modeling engines to determine if a given transform model may be eligible to process provided interactive inputs.

Further, in one or more of the various embodiments, model interfaces may be arranged to specify additional constraints or requirements to determine if corresponding data transform models may be eligible in a given circumstance. For example, in some embodiments, model interfaces may include value based constraints as well as type based constraints. Accordingly, for example, a model interface may specify a require type or a range of acceptable values.

In one or more of the various embodiments, model interfaces may be arranged to execute various computer readable instructions, condition checks, pattern matching, or the like, provided via configuration information. Accordingly, in some embodiments, data model transforms or their model interfaces may be modified or adapted to local circumstances.

At decision block 1406, in one or more of the various embodiments, if one or more eligible data transform models may be determined, control may flow to decision block 1408; otherwise, control may be returned to a calling process.

In some embodiments, all data transform models may be considered or determined ineligible even though one or more data objects may have been selected based on interactive inputs. Accordingly, in one or more of the various embodiments, visualization platforms may be arranged to provide a user a cue (e.g., visual or audio) that the current selection will not result in a data transformation. Generally, this indicates that the current selection cannot be mapped to a data transform model. In one or more of the various embodiments, a remedy may include modifying the selection, modifying one or more data transform models, adding or activating one or more data transform models.

At decision block 1408, in one or more of the various embodiments, if there is more than one eligible data transform model, control may flow to block 1510; otherwise, control may flow to block 1514. In some embodiments, two or more data transform models may be determined to be eligible. For example, if the model interfaces for two or more different data transform models may be satisfied by the current input information the two or more different data transform models may be selected here.

At block 1410, in one or more of the various embodiments, the modeling engine may be arranged to rank order two or more data transform models. In one or more of the various embodiments, as described above, data transform models may be associated with scores that may be employed to weight the two or more data transform models against each other.

In one or more of the various embodiments, data transform models may be associated with one or more other scores, such as, priority scores, quality of match scores, confidence scores, quantitized scores (e.g., high, med, low, etc.), compound scores generated based on a formula, or the like. Accordingly, in one or more of the various embodiments, modeling engines may be arranged to rank the two or more data transform models based on the one or more ranking scores.

At block 1412, in one or more of the various embodiments, optionally, the modeling engine may be arranged to display the rank ordered list of data transform models. In some embodiments, visualization platforms may be arranged to display a popup menu, or the like, that enables a user to see some or all of the rank ordered list. Accordingly, in some embodiments, the user may be enabled to manually select a lower-ranked transformation over a higher ranked transformation. Also, in some embodiments, modeling engines may be arranged to employ the top-ranked transformation if a user does not make a selection or confirmation.

Likewise, in one or more of the various embodiments, modeling engines may be arranged to require affirmative selections/confirmations by users before particular transformations may be executed. Thus, in some embodiments, even if a transformation is the top ranked transformation, in some cases, the modeling engine may require express confirmation before executing the transformation.

In some embodiments, requiring express confirmation may depend on one or more values, such as, confidence scores, impact scores, or the like. In some embodiments, modeling engines may be arranged to employ rules, instructions, or the like, provided via configuration information to adapt or modify express confirmation requirements based on local circumstances.

Note, for some embodiments, this step may be optional because in some cases, the modeling engine may be arranged to automatically select a data transform model from among the rank ordered list of data transform models without displaying a list to a user.

At block 1414, in one or more of the various embodiments, the modeling engine may be arranged to execute one or more graph transformation on the graph model based on one or more graph transform models. As described above, each data transform model may include a model body that includes computer readable instructions, computer readable data, or the like. In some embodiments, model bodies may include references to computer readable instructions, libraries, plugins, or services that may be employed to execute a data transformation.

In one or more of the various embodiments, two or more data transformations may be executed. In some embodiments, two or more data transformations may be independent enabling the two or more data transformations to be executed simultaneously or concurrently.

In one or more of the various embodiments, modeling engines may be arranged to perform one or more actions based on the specifications included by or referenced by the model bodies that correspond to the determined data transform models.

In some embodiments, if two or more data transform models have been determined to be eligible, the corresponding transformations may be attempted, one after the other, until a first transformation have been executed successfully. Accordingly, in some embodiments, modeling engines may try each data transform model in order until the first one has performed its transformation. Thus, in one or more of the various embodiments, each eligible data transform models may attempt a data transformation until the first one succeeds.

Accordingly, in one or more of the various embodiments, modeling engines may be arranged to rely on the data transform model to be the final arbiter with respect to if a transformation may occur. In some embodiments, one or more data transform models may be arranged to apply other/additional input beyond the interactive input information (e.g., the selected data objects) that may be provided. In some embodiments, data transform models may be arranged to employ one or more external services to provide or evaluate information that may be relevant to the transformation attempted by the data transform model.

For example, in some embodiments, a data transform model may be arranged to evaluate if a data object may be an employee of an organization rather than a customer. For example, a transformation step may include generating a particular node or relationship in the graph model if the data object represents an employee rather than a customer. In this example, the data transform model may be arranged to submit information (e.g., name, address, or the like) included in the provided data objects to an organization's directory service that can confirm if the email address corresponds to an employee. Thus, in this example, if the data object information represents an employee, the transformation may execute. Or, if the data object information represents a customer the transformation fails enabling a subsequent data transform model to attempt a data transformation.

Note, in one or more of the various embodiments, data transform models may be described as executing or performing actions associated with data transformation. However, in some embodiments, the modeling engine may be arranged to execute one or more actions on behalf of data transform models based on information (e.g., instructions) included in the data transform models.

Next, in one or more of the various embodiments, control may be returned to a calling process.

Figure 15:
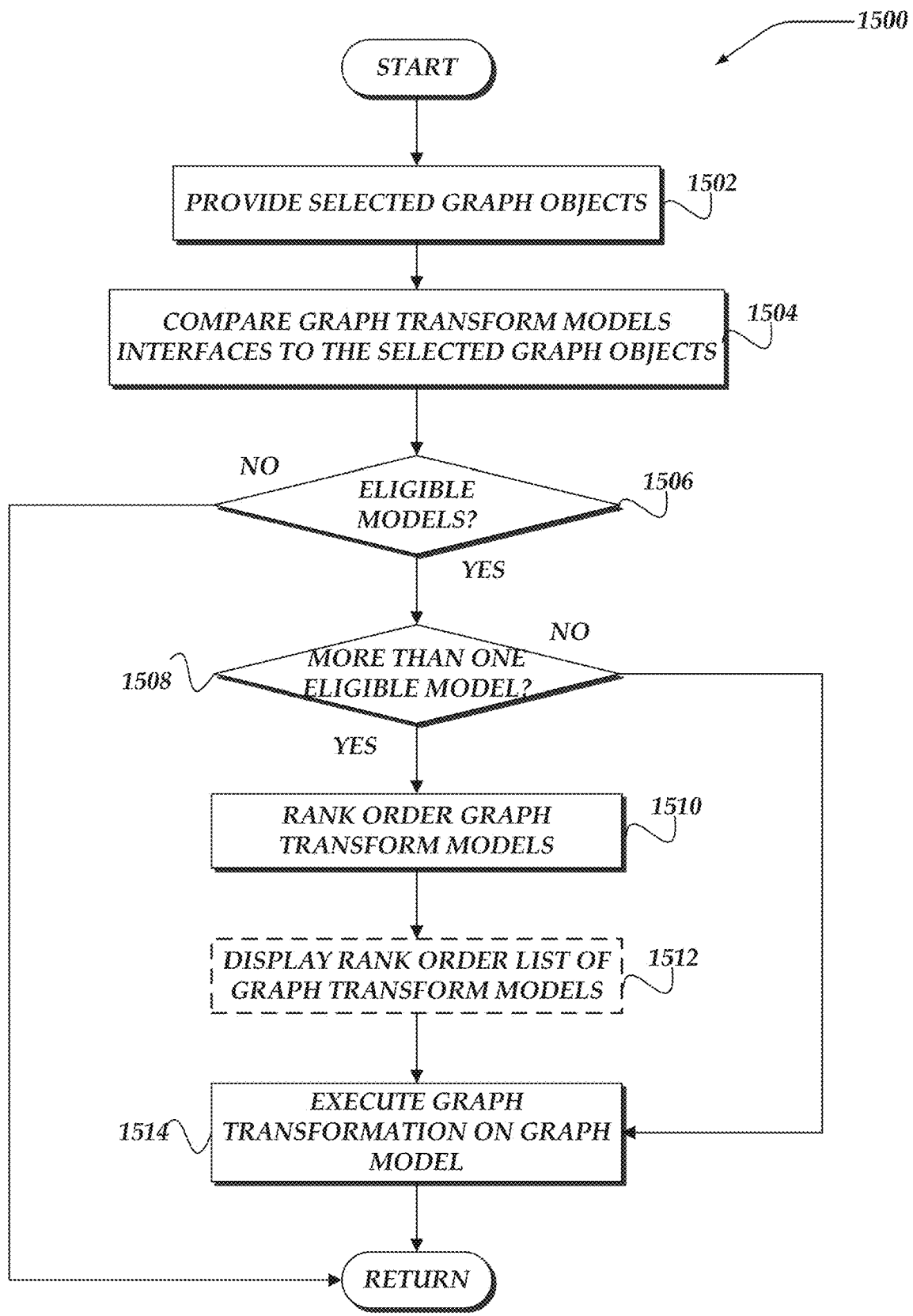
FIG. 15 illustrates a flowchart for a process for dynamic graph generation for interactive data analysis in accordance with one or more of the various embodiments.

FIG. 15 illustrates a flowchart for process 1500 for dynamic graph generation for interactive data analysis in accordance with one or more of the various embodiments. After a start block at block 1502, in one or more of the various embodiments, one or more selected graph objects may be provided to a modeling engine.

At block 1504, in one or more of the various embodiments, the modeling engine may be arranged to compare one or more graph transform model interfaces to the selected graph objects.

At decision block 1506, in one or more of the various embodiments, if one or more eligible graph transform models may be determined, control may flow to decision block 1508; otherwise, control may be returned to a calling process.

At decision block 1508, in one or more of the various embodiments, if there is more than one eligible graph transform model, control may flow to block 1510; otherwise, control may flow to block 1514.

At block 1510, in one or more of the various embodiments, the modeling engine may be arranged to rank order two or more graph transform models.

At block 1512, in one or more of the various embodiments, optionally, the modeling engine may be arranged to display the rank ordered list of graph transform models.

Note, for some embodiments, this step may be optional because in some cases, the modeling engine may be arranged to automatically select a graph transform model from among the rank ordered list of graph transform models without displaying a list to a user.

At block 1514, in one or more of the various embodiments, the modeling engine may be arranged to execute one or more graph transformation on the graph model based on one or more graph transform models.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for visualizing data using a computer that includes one or more processors, where each step of the method is performed by the one or more processors, comprising:

generating a user interface that includes a graph panel and a visualization panel, wherein the graph panel and the visualization panel are arranged to receive one or more inputs or interactions;

providing a data model that includes a plurality of records, wherein one or more portions of the data model are displayed in the visualization panel;

providing input information based on one or more inputs to the visualization panel, wherein the input information specifies one or more portions of the data model;

determining one or more transform models based on the one or more specified portions of the data model, wherein the determined one or more transform models include a model interface that accepts the input information based on one or more acceptable characteristics of inputs from the one or more specified portions of the data model;

employing the model interface of the one or more transform models to determine eligibility of each transform model to transform one or more data objects for the one or more portions of the data model;

in response the model interface determining the one or more transform models are ineligible to provide transformations for the one or more data objects, employing the user interface to provide one or more of playing an audio cue or displaying a visual cue and provide one or more recommendations to remedy the ineligibility that are determined by the model interface;

employing one or more eligible transform models to perform further actions, including:

generating one or more graph objects based on the data model and the input information, wherein the one or more graph objects are included in a graph model that is comprised of nodes that represent the one or more graph objects and one or more edges that represent one or more relationships between two or more graph objects, and wherein at least one of the one or more relationships is unrepresented in the data model; and evaluating one or more attributes of a first portion of the one or more graph objects with one or more other attributes of a second portion of the one or more graph objects; and determining the one or more relationships based on the evaluation satisfying one or more conditions specified in the one or more eligible transform models; and executing a query based on the graph model to provide one or more results from the data model, wherein the one or more results are displayed in a visualization to one or more users.

2. The method of claim 1, wherein generating the one or more graph objects, further comprises:
determining one or more operations that are specified by the one or more eligible transform models; and
executing the one or more operations on the data model to generate the one or more graph objects.

3. The method of claim 1, wherein providing the data model, further comprises, providing one or more data sources based on one or more of a database, a columnar data store, or structured text files.

4. The method of claim 1, further comprising:
providing other input information based on one or more inputs to the graph panel, wherein the other input information specifies one or more of the one or more nodes or the one or more edges of the graph model;
determining one or more graph transform models based on the other input information; and
modifying the graph model based on the one or more graph transform models.

5. The method of claim 1, wherein executing the query based on the graph model, further comprises:
determining one or more graph objects that correspond to the query;
determining one or more records from the data model based on the one or more graph objects that correspond to the query; and
generating the one or more results to the query based on the one or more records.

6. The method of claim 1, further comprising:
determining two or more eligible transform models based on the input information;
rank ordering the two or more eligible transform models based on a weight score; and
employing one or more transform models to generate the one or more graph objects based on the ranked ordering.

7. A processor readable non-transitory storage media that includes instructions for visualizing data, wherein execution of the instructions by one or more processors, performs actions, comprising:
generating a graphical user interface (GUI) that includes a graph panel and a visualization panel, wherein the graph panel and the visualization panel are arranged to receive one or more inputs or interactions;
providing a data model that includes a plurality of records, wherein one or more portions of the data model are displayed in the visualization panel;
providing input information based on one or more inputs to the visualization panel, wherein the input information specifies one or more portions of the data model;
determining one or more transform models based on the one or more specified portions of the data model, wherein the determined one or more transform models include a model interface that accepts the input information based on one or more acceptable characteristics of inputs from the one or more specified portions of the data model;
employing the model interface of the one or more transform models to determine eligibility of each transform model to transform one or more data objects for the one or more portions of the data model;

in response the model interface determining the one or more transform models are ineligible to provide transformations for the one or more data objects, employing the user interface to provide one or more of playing an audio cue or displaying a visual cue and provide one or more recommendations to remedy the ineligibility that are determined by the model interface;
employing one or more eligible transform models to perform further actions, including:
generating one or more graph objects based on the data model and the input information, wherein the one or more graph objects are included in a graph model that is comprised of nodes that represent the one or more graph objects and one or more edges that represent one or more relationships between two or more graph objects, and wherein at least one of the one or more relationships is unrepresented in the data model; and
evaluating one or more attributes of a first portion of the one or more graph objects with one or more other attributes of a second portion of the one or more graph objects; and
determining the one or more relationships based on the evaluation satisfying one or more conditions specified in the one or more eligible transform models; and
executing a query based on the graph model to provide one or more results from the data model, wherein the one or more results are displayed in a visualization to one or more users.

8. The media of claim 7, wherein generating the one or more graph objects, further comprises:
determining one or more operations that are specified by the one or more eligible transform models; and
executing the one or more operations on the data model to generate the one or more graph objects.

9. The media of claim 7, wherein providing the data model, further comprises, providing one or more data sources based on one or more of a database, a columnar data store, or structured text files.

10. The media of claim 7, further comprising:
providing other input information based on one or more inputs to the graph panel, wherein the other input information specifies one or more of the one or more nodes or the one or more edges of the graph model;
determining one or more graph transform models based on the other input information; and
modifying the graph model based on the one or more graph transform models.

11. The media of claim 7, wherein executing the query based on the graph model, further comprises:
determining one or more graph objects that correspond to the query;
determining one or more records from the data model based on the one or more graph objects that correspond to the query; and
generating the one or more results to the query based on the one or more records.

12. The media of claim 7, further comprising:
determining two or more eligible transform models based on the input information;
rank ordering the two or more eligible transform models based on a weight score; and
employing one or more transform models to generate the one or more graph objects based on the ranked ordering.

13. A system for visualizing data:
a network computer, comprising:
 a transceiver that communicates over the network;
 a memory that stores at least instructions; and
 one or more processors that execute instructions that perform actions, including:
  generating a graphical user interface (GUI) that includes a graph panel and a visualization panel, wherein the graph panel and the visualization panel are arranged to receive one or more inputs or interactions;
  providing a data model that includes a plurality of records, wherein one or more portions of the data model are displayed in the visualization panel;
  providing input information based on one or more inputs to the visualization panel, wherein the input information specifies one or more portions of the data model;
  determining one or more transform models based on the one or more specified portions of the data model, wherein the determined one or more transform models include a model interface that accepts the input information based on one or more acceptable characteristics of inputs from the one or more specified portions of the data model;
  employing the model interface of the one or more transform models to determine eligibility of each transform model to transform one or more data objects for the one or more portions of the data model;
  in response the model interface determining the one or more transform models are ineligible to provide transformations for the one or more data objects, employing the user interface to provide one or more of playing an audio cue or displaying a visual cue and provide one or more recommendations to remedy the ineligibility that are determined by the model interface;
  employing one or more eligible transform models to perform further actions, including:
   generating one or more graph objects based on the data model and the input information, wherein the one or more graph objects are included in a graph model that is comprised of nodes that represent the one or more graph objects and one or more edges that represent one or more relationships between two or more graph objects, and wherein at least one of the one or more relationships is unrepresented in the data model; and
   evaluating one or more attributes of a first portion of the one or more graph objects with one or more other attributes of a second portion of the one or more graph objects; and
   determining the one or more relationships based on the evaluation satisfying one or more conditions specified in the one or more eligible transform models; and
  executing a query based on the graph model to provide one or more results from the data model, wherein the one or more results are displayed in a visualization to one or more users; and
a client computer, comprising:
 a transceiver that communicates over the network;
 a memory that stores at least instructions; and
 one or more processors that execute instructions that perform actions, including:
  providing one or more portions of the input information.

14. The system of claim 13, wherein generating the one or more graph objects, further comprises:
 determining one or more operations that are specified by the one or more eligible transform models; and
 executing the one or more operations on the data model to generate the one or more graph objects.

15. The system of claim 13, wherein providing the data model, further comprises, providing one or more data sources based on one or more of a database, a columnar data store, or structured text files.

16. The system of claim 13, wherein the one or more processors of the network computer execute instructions that perform actions, further comprising:
 providing other input information based on one or more inputs to the graph panel, wherein the other input information specifies one or more of the one or more nodes or the one or more edges of the graph model;
 determining one or more graph transform models based on the other input information; and
 modifying the graph model based on the one or more graph transform models.

17. The system of claim 13, wherein executing the query based on the graph model, further comprises:
 determining one or more graph objects that correspond to the query;
 determining one or more records from the data model based on the one or more graph objects that correspond to the query; and
 generating the one or more results to the query based on the one or more records.

18. The system of claim 13, wherein the one or more processors of the network computer execute instructions that perform actions, further comprising:
 determining two or more eligible transform models based on the input information;
 rank ordering the two or more eligible transform models based on a weight score; and
 employing one or more transform models to generate the one or more graph objects based on the ranked ordering.

19. A network computer for visualizing data, comprising:
 a transceiver that communicates over the network;
 a memory that stores at least instructions; and
 one or more processors that execute instructions that perform actions, including:
  generating a graphical user interface (GUI) that includes a graph panel and a visualization panel, wherein the graph panel and the visualization panel are arranged to receive one or more inputs or interactions;
  providing a data model that includes a plurality of records, wherein one or more portions of the data model are displayed in the visualization panel;
  providing input information based on one or more inputs to the visualization panel, wherein the input information specifies one or more portions of the data model;
  determining one or more transform models based on the one or more specified portions of the data model, wherein the determined one or more transform models include a model interface that accepts the input information based on one or more acceptable characteristics of inputs from the one or more specified portions of the data model;

employing the model interface of the one or more transform models to determine eligibility of each transform model to transform one or more data objects for the one or more portions of the data model;

in response the model interface determining the one or more transform models are ineligible to provide transformations for the one or more data objects, employing the user interface to provide one or more of playing an audio cue or displaying a visual cue and provide one or more recommendations to remedy the ineligibility that are determined by the model interface;

employing one or more eligible transform models to perform further actions, including:

generating one or more graph objects based on the data model and the input information, wherein the one or more graph objects are included in a graph model that is comprised of nodes that represent the one or more graph objects and one or more edges that represent one or more relationships between two or more graph objects, and wherein at least one of the one or more relationships is unrepresented in the data model; and evaluating one or more attributes of a first portion of the one or more graph objects with one or more other attributes of a second portion of the one or more graph objects; and determining the one or more relationships based on the evaluation satisfying one or more conditions specified in the one or more eligible transform models; and executing a query based on the graph model to provide one or more results from the data model, wherein the one or more results are displayed in a visualization to one or more users.

20. The network computer of claim 19, wherein generating the one or more graph objects, further comprises:
determining one or more operations that are specified by the one or more eligible transform models; and
executing the one or more operations on the data model to generate the one or more graph objects.

21. The network computer of claim 19, wherein providing the data model, further comprises, providing one or more data sources based on one or more of a database, a columnar data store, or structured text files.

22. The network computer of claim 19, wherein the one or more processors execute instructions that perform actions, further comprising:
providing other input information based on one or more inputs to the graph panel, wherein the other input information specifies one or more of the one or more nodes or the one or more edges of the graph model;
determining one or more graph transform models based on the other input information; and
modifying the graph model based on the one or more graph transform models.

23. The network computer of claim 19, wherein executing the query based on the graph model, further comprises:
determining one or more graph objects that correspond to the query;
determining one or more records from the data model based on the one or more graph objects that correspond to the query; and
generating the one or more results to the query based on the one or more records.

24. The network computer of claim 19, wherein the one or more processors execute instructions that perform actions, further comprising:
determining two or more eligible transform models based on the input information;
rank ordering the two or more eligible transform models based on a weight score; and
employing one or more transform models to generate the one or more graph objects based on the ranked ordering.

* * * * *